US012710897B2

(12) United States Patent
Kajihara et al.

(10) Patent No.: US 12,710,897 B2
(45) Date of Patent: Aug. 18, 2026

(54) MEMORY SYSTEM TRACKING MEMORY ACCESSES

(71) Applicant: Kioxia Corporation, Tokyo (JP)

(72) Inventors: Hirotsugu Kajihara, Yokohama (JP); Yukimasa Miyamoto, Yokohama (JP); Daisuke Taki, Yokohama (JP); Akiyuki Kaneko, Yokohama (JP); Kazuhiro Hiwada, Kamakura (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 19/066,350

(22) Filed: Feb. 28, 2025

(65) Prior Publication Data

US 2026/0079646 A1 Mar. 19, 2026

(30) Foreign Application Priority Data

Sep. 13, 2024 (JP) ................................ 2024-159174

(51) Int. Cl.
*G06F 3/06* (2006.01)

(52) U.S. Cl.
CPC ............ *G06F 3/0659* (2013.01); *G06F 3/061* (2013.01); *G06F 3/0679* (2013.01)

(58) Field of Classification Search
CPC ....... G06F 3/0659; G06F 3/061; G06F 3/0679
USPC .......................................................... 711/154
See application file for complete search history.

(56) References Cited

U.S. PATENT DOCUMENTS

| | | | | |
|---|---|---|---|---|
| 2022/0035567 | A1 * | 2/2022 | Song | G06F 12/0246 |
| 2022/0261174 | A1 * | 8/2022 | Igahara | G06F 12/0246 |
| 2023/0044342 | A1 | 2/2023 | Wilkinson | |
| 2023/0376238 | A1 | 11/2023 | Lee et al. | |
| 2024/0070072 | A1 | 2/2024 | Roberts | |
| 2025/0138732 | A1 * | 5/2025 | Tringali | G06F 3/0673 |

* cited by examiner

*Primary Examiner* — Than Nguyen
(74) *Attorney, Agent, or Firm* — Oblon, McClelland, Maier & Neustadt, L.L.P.

(57) ABSTRACT

A memory system is configured to access a host in conformity with a CXL™ (Compute Express Link) interface protocol. The memory system includes: a non-volatile memory; a volatile memory; and a memory controller configured to manage a number of accesses to the non-volatile memory by address and store numbers of accesses in the volatile memory as a histogram. The memory controller includes an update unit configured to, in reception of a command from the host: in a case where a condition is satisfied, skip reading of a number of accesses for a command address designated by the command, and in a case where the predetermined condition is not satisfied, read the number of accesses for the command address, and change the number of accesses for the command address stored in the volatile memory.

21 Claims, 16 Drawing Sheets

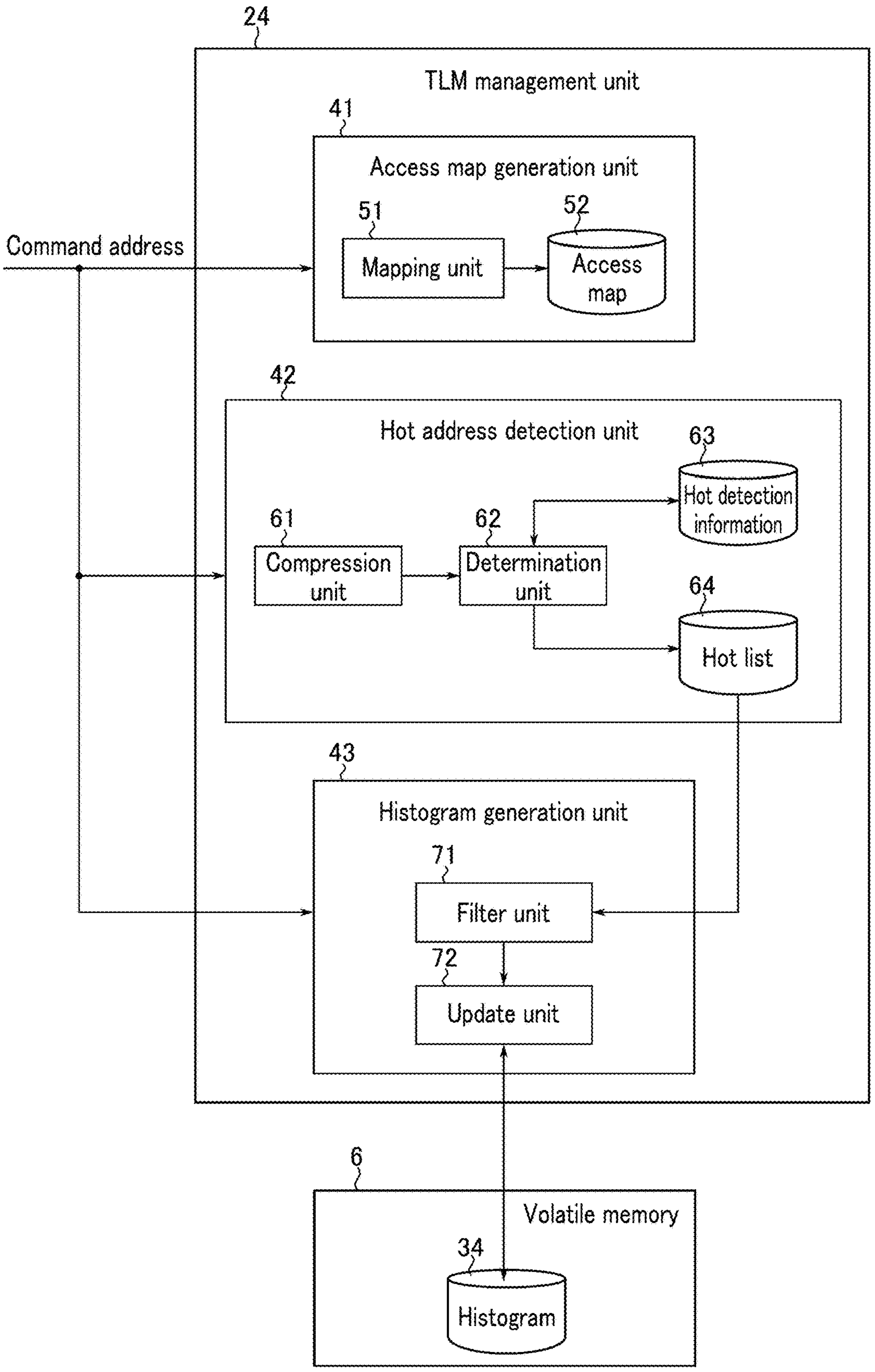
F I G. 3

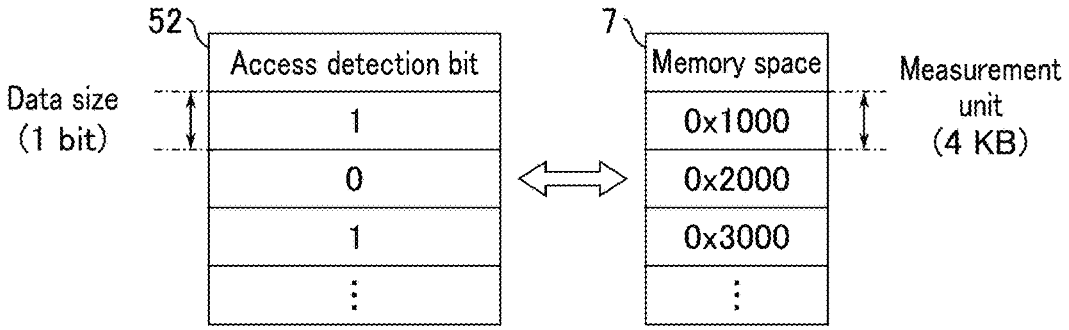

F I G. 4

63

Address table corresponding to hash values

| Address | Probability count value |
| --- | --- |
| 0x30000 | 4 |
| 0x21000 | 1 |
| 0x62000 | 3 |
| ⋮ | ⋮ |

7

Memory space

0x00000
0x10000
0x20000
0x30000
⋮
0xF0000

Sub-memory spaces corresponding to identical hash value (hash function is constituted so that a plurality of addresses of measurement unit (4KB) are included)

0x01000
0x11000
0x21000
⋮
0xF1000

Sub-memory spaces corresponding to identical hash value

0x02000
0x12000
0x13000
⋮
0xF2000

Sub-memory spaces corresponding to identical hash value

⋮

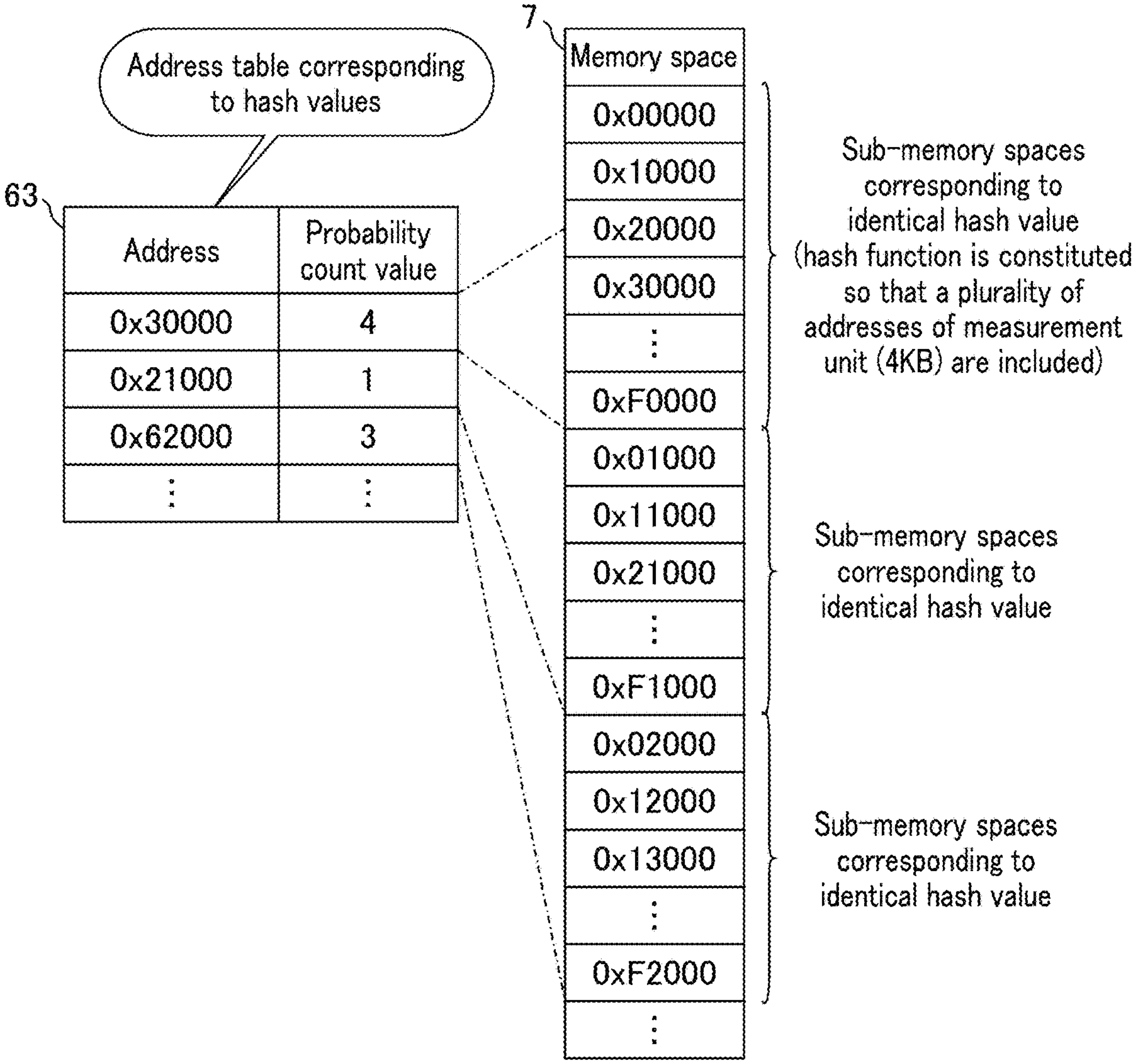

F I G. 5

Start
S1 Initialize access map, hot detection information, hot list, and histogram
S2 Wait until command address is received or count period ends
S3 Has command address been received?
yes
no
S4 Access map update process
S5 Hot list update process
S6 Histogram update process
S7 Has count period ended?
no
yes
S8 Telemetry transmission process
End
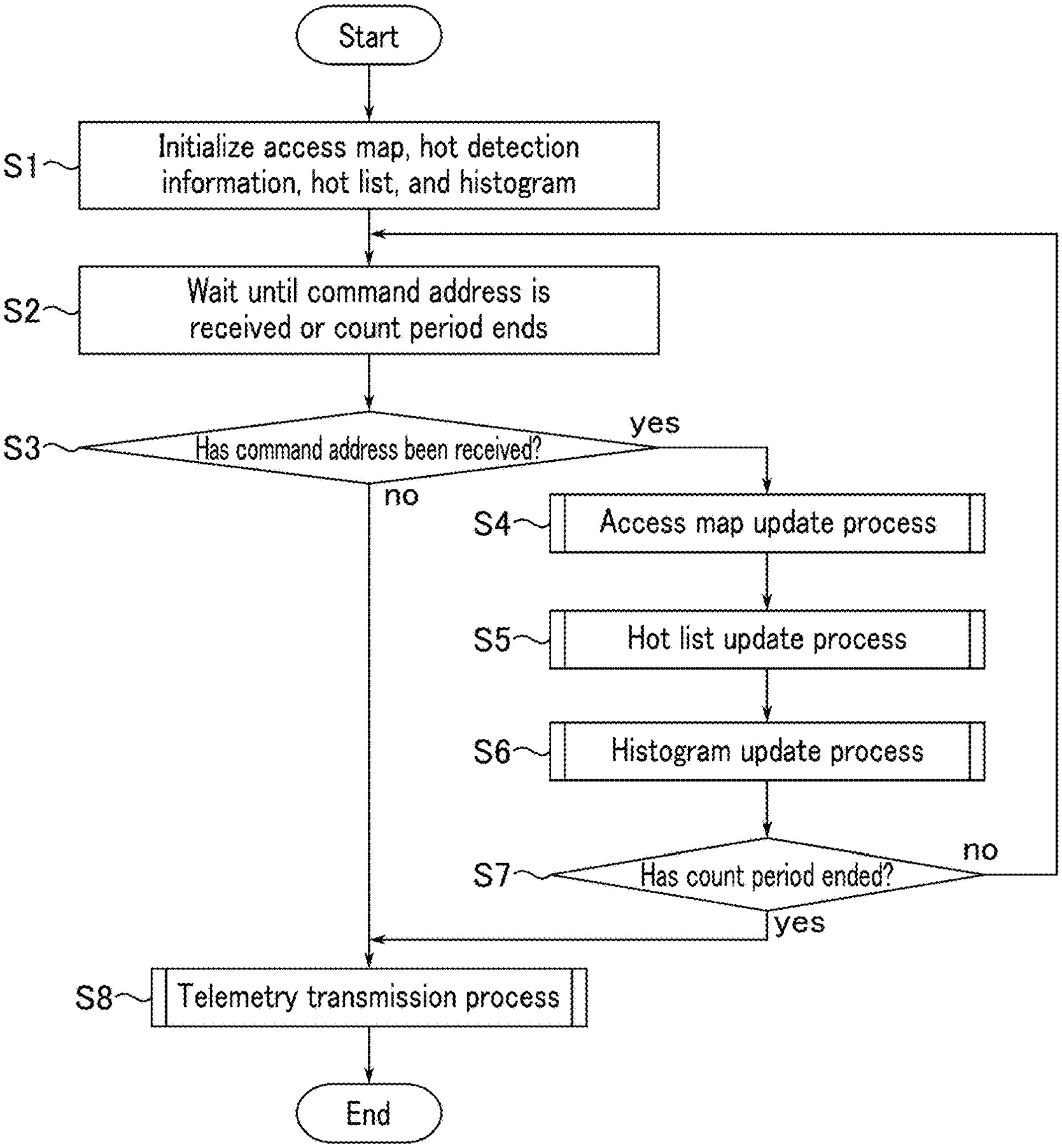
F I G. 8
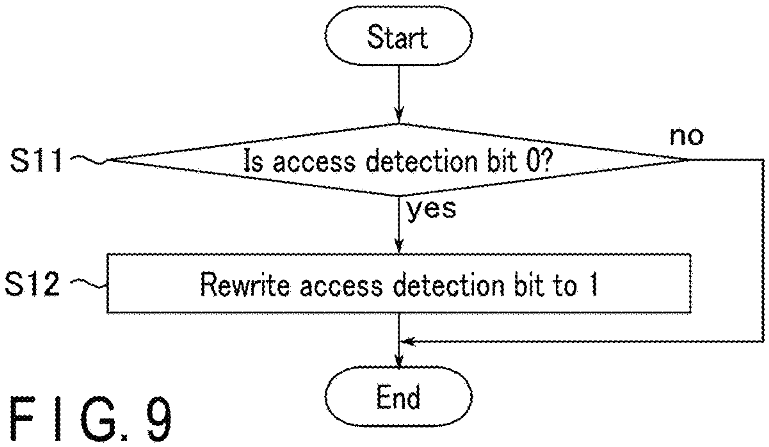
F I G. 9

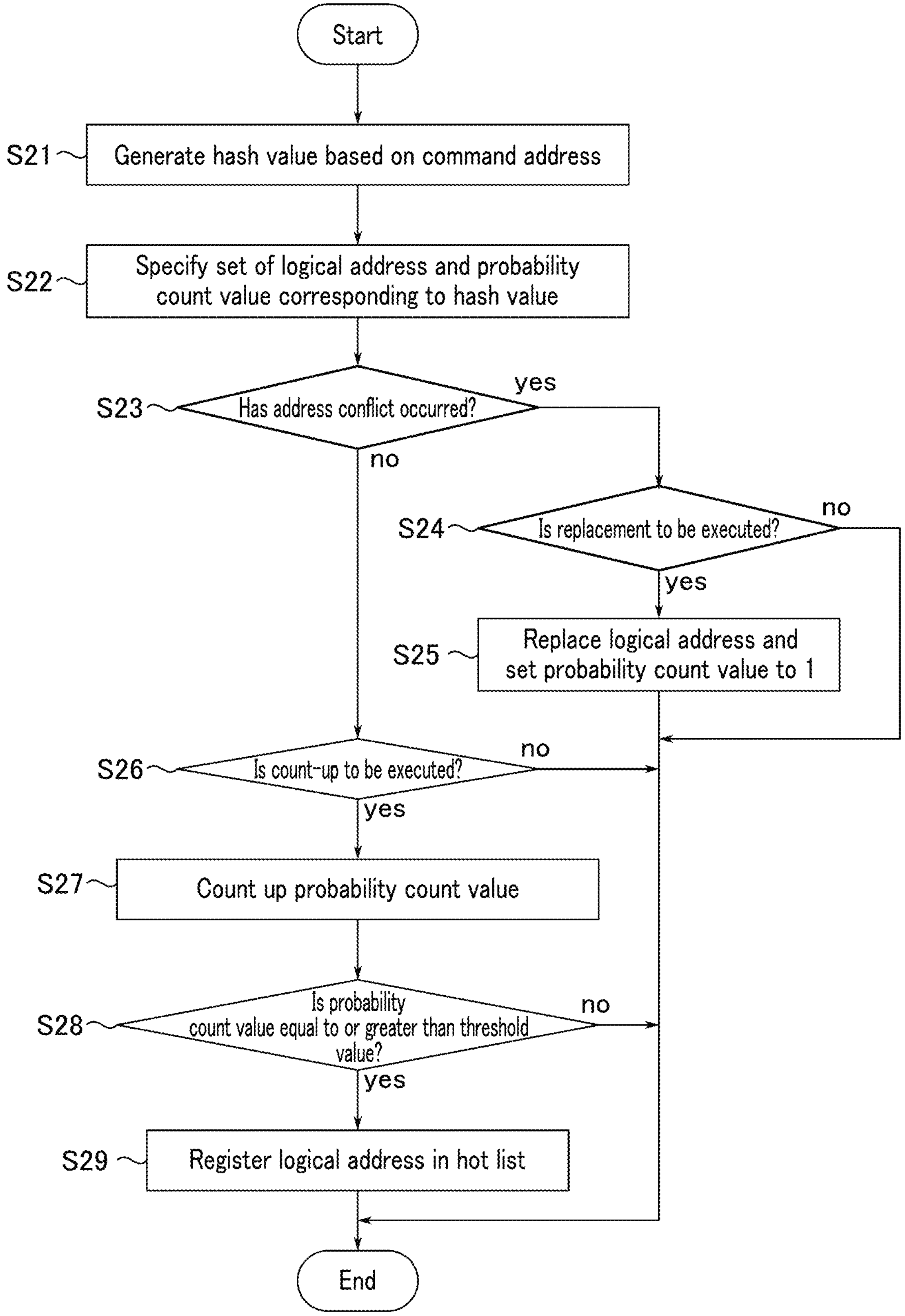
F I G. 10

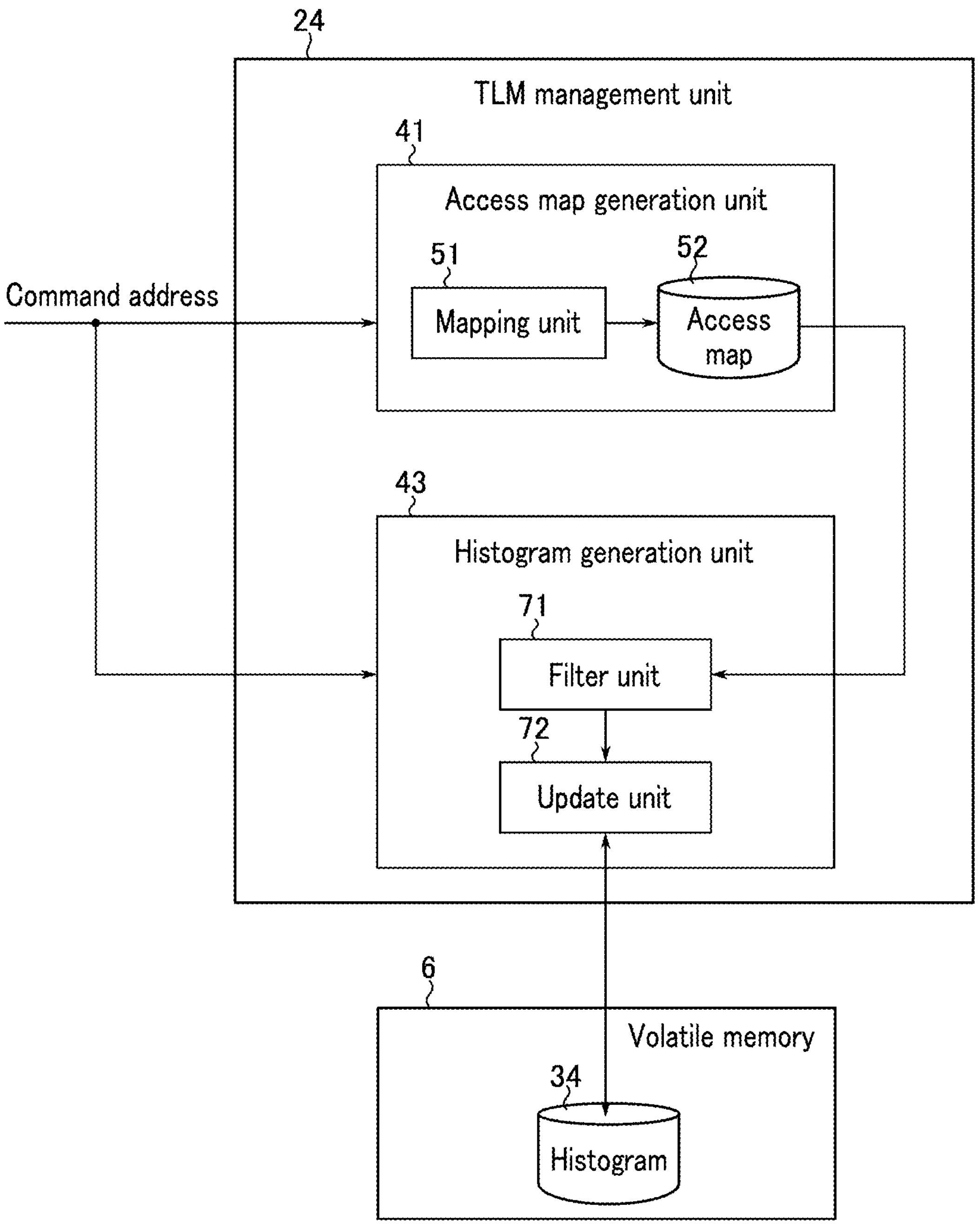
F I G. 14

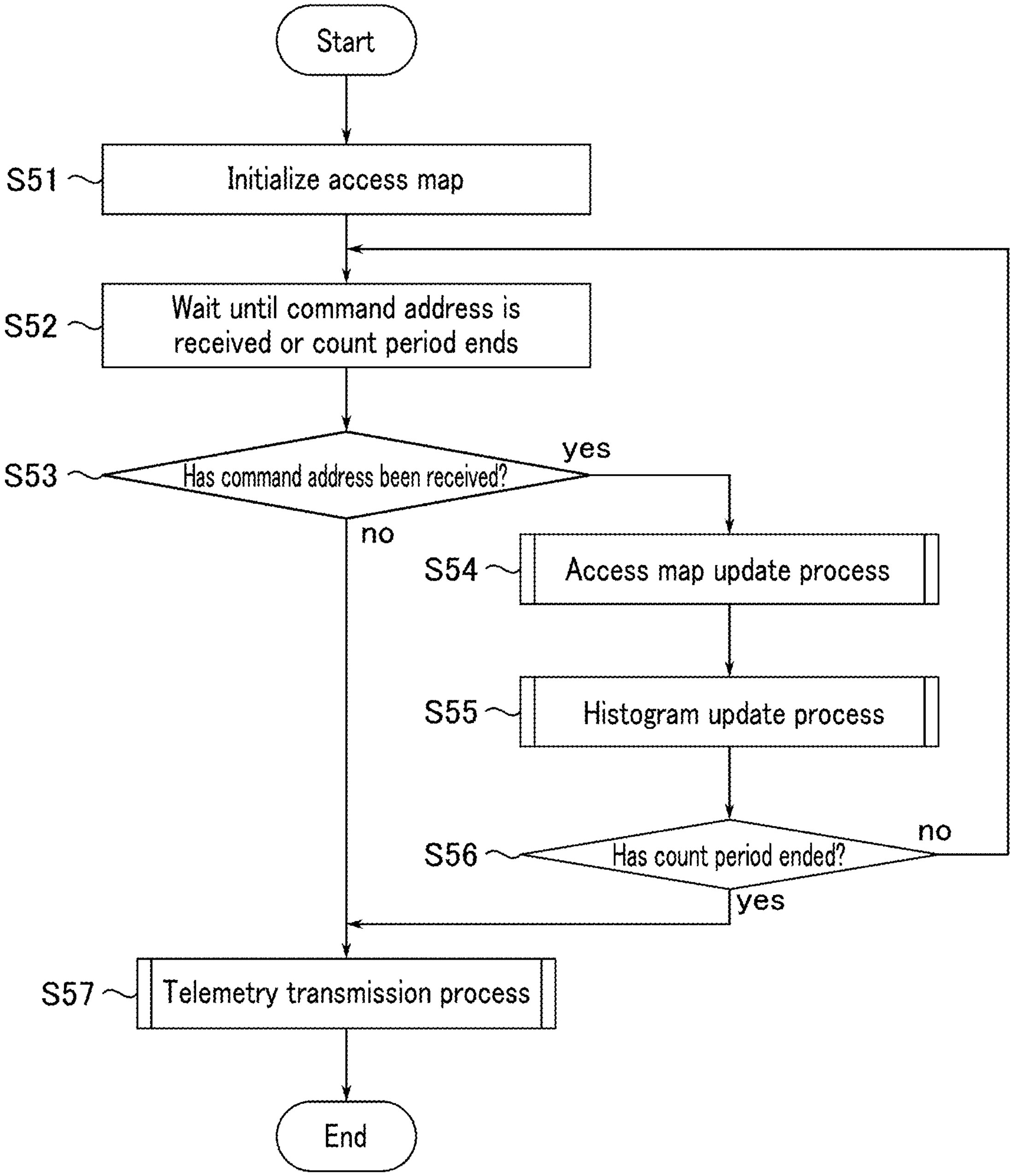
F I G. 15

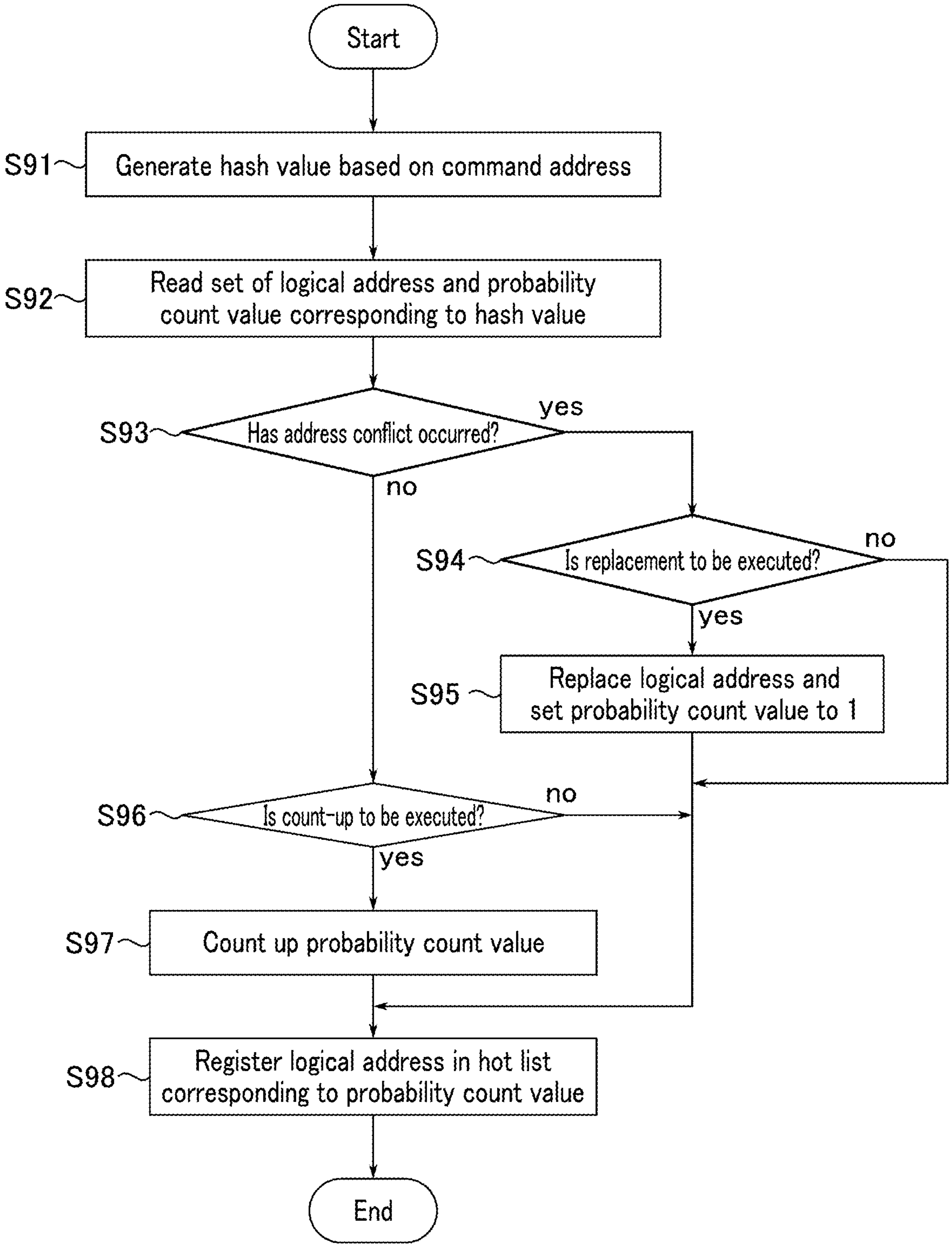
F I G. 19

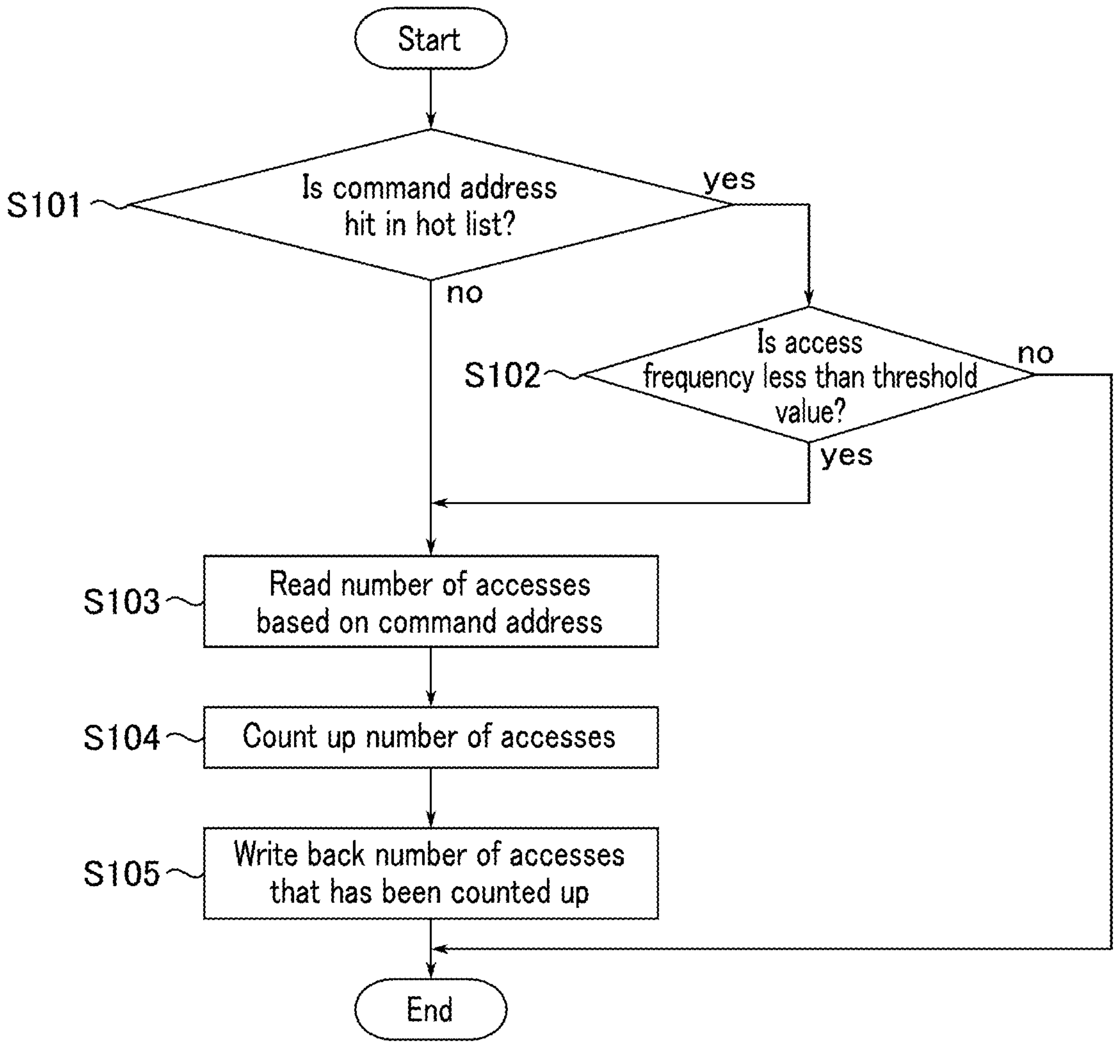
F I G. 20

MEMORY SYSTEM TRACKING MEMORY ACCESSES

CROSS-REFERENCE TO RELATED APPLICATIONS

This application is based upon and claims the benefit of priority from Japanese Patent Application No. 2024-159174, filed Sep. 13, 2024, the entire contents of which are incorporated herein by reference.

FIELD

Embodiments described herein relate generally to a memory system.

BACKGROUND

A memory system including a NAND flash memory as a non-volatile memory and a memory controller that controls the non-volatile memory is known. The memory system is connected to a host to form an information processing system. In order to suppress deterioration of latency, the memory controller notifies the host of an access frequency to the non-volatile memory.

BRIEF DESCRIPTION OF THE DRAWINGS

FIG. 3 is a block diagram illustrating an example of a relationship between a functional configuration of a TLM management unit included in the memory controller and a histogram which is one of the various types of information stored in the volatile memory according to the first embodiment.

FIG. 4 is a diagram illustrating an example of a data structure of an access map stored in the memory controller according to the first embodiment.

FIG. 5 is a diagram illustrating an example of a data structure of hot detection information stored in the memory controller according to the first embodiment.

FIG. 8 is a flowchart illustrating an example of an overall process from generation to transmission of the histogram in a memory system according to the first embodiment.

FIG. 9 is a flowchart illustrating an example of an access map update process in the memory system according to the first embodiment.

FIG. 10 is a flowchart illustrating an example of a hot list update process in the memory system according to the first embodiment.

FIG. 14 is a block diagram illustrating an example of a relationship between a functional configuration of a TLM management unit included in a memory controller and a histogram which is one of various types of information stored in a volatile memory according to a second embodiment.

FIG. 15 is a flowchart illustrating an example of a telemetry transmission process in a memory system according to the second embodiment.

FIG. 19 is a flowchart illustrating an example of a hot list update process in a memory system according to a third modification.

FIG. 20 is a flowchart illustrating an example of a histogram update process in a memory system according to a fourth modification.

DETAILED DESCRIPTION

Figure 1:
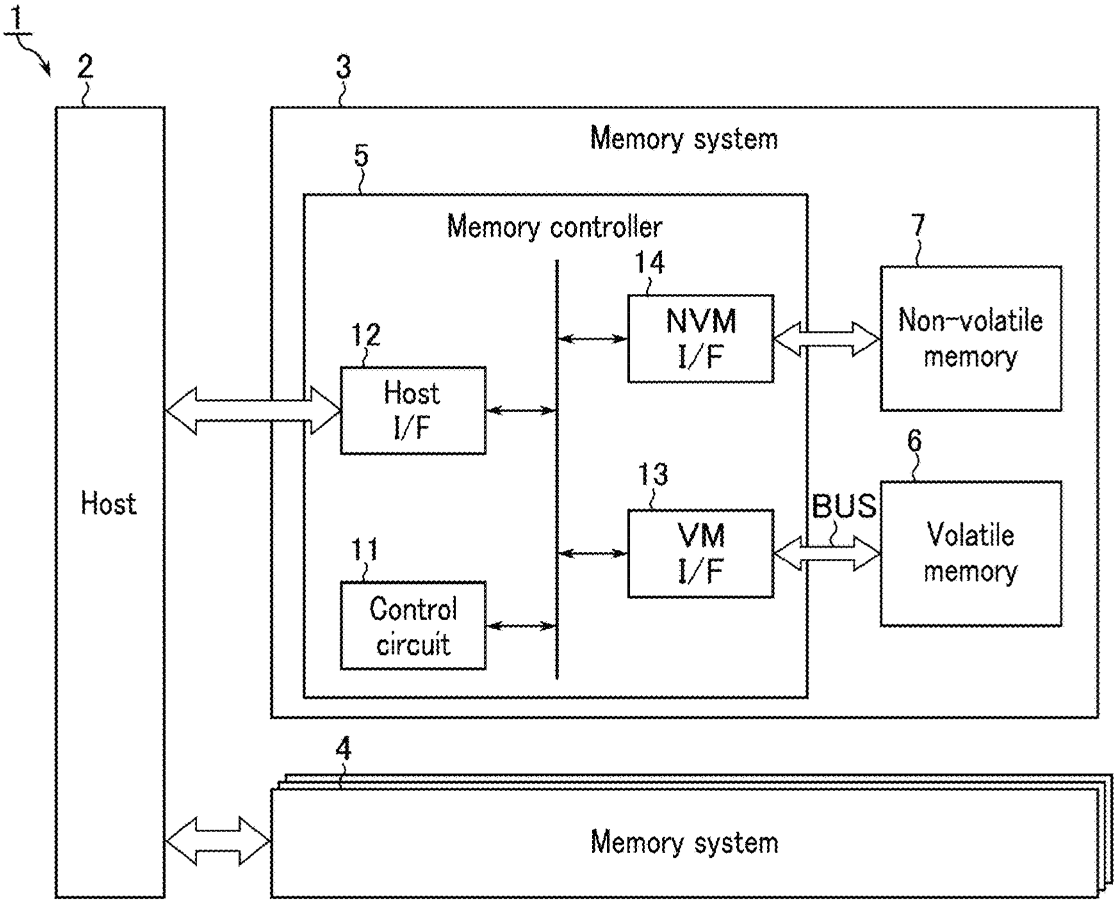
FIG. 1 is a block diagram illustrating an example of a configuration of an information processing system according to a first embodiment.

In general, according to one embodiment, a memory system is configured to access a host in conformity with a CXL™ (Compute Express Link) interface protocol. The memory system includes: a non-volatile memory; a volatile memory; and a memory controller configured to manage a number of accesses to the non-volatile memory by address and store numbers of accesses in the volatile memory as a histogram. The memory controller includes an update unit configured to, in reception of a command from the host: in a case where a predetermined condition is satisfied, skip reading, from the volatile memory, of an number of accesses for a command address designated by the command among the numbers of accesses included in the histogram, and in a case where the predetermined condition is not satisfied, read, from the volatile memory, the number of accesses for the command address among the numbers of accesses included in the histogram, and change the number of accesses for the command address stored in the volatile memory.

Hereinafter, embodiments will be described with reference to the drawings. In the following description, components having the same functions and configurations are denoted by the common reference numeral. In addition, in a case where a plurality of components having the common reference numeral are distinguished, the common reference numeral is given with suffixes for differentiation. Note that, in a case where a plurality of components do not need to be particularly distinguished, only a common reference numeral is given to the components, and no suffix is attached.

1. First Embodiment

1.1 Configuration

1.1.1 Information Processing System

A configuration of an information processing system according to a first embodiment will be described.

FIG. 1 is a block diagram illustrating an example of a configuration of an information processing system according to the first embodiment. As illustrated in FIG. 1, an information processing system 1 includes a host 2, a memory system 3, and a plurality of memory systems 4. The host 2 and each of the memory system 3 and the memory systems 4 are connected via a host bus. Communication between the host 2 and each of the memory system 3 and the memory systems 4 conforms to a CXL™ (Compute Express Link) interface protocol, for example.

The host 2 is a server in a data center, for example. The host 2 performs information processing using data stored in the memory system 3 and the memory systems 4. For example, the host 2 uses a different memory system in which data is stored according to an access frequency of the data.

The memory system 3 is a storage device such as a memory card such as an SD™ card, a universal flash storage (UFS), or a solid state drive (SSD), for example.

The memory systems 4 are storage devices having a latency different from that of the memory system 3. The memory systems 4 may include, for example, a memory system having a latency longer than that of the memory system 3. The memory systems 4 may include, for example, a memory system having a latency shorter than that of the memory system 3.

1.1.2 Memory System

Next, an internal configuration of the memory system 3 will be described with continuous reference to FIG. 1. As illustrated in FIG. 1, the memory system 3 includes a memory controller 5, a volatile memory 6, and a non-volatile memory 7.

The memory controller 5 includes, for example, an integrated circuit such as a system-on-a-chip (SoC). The memory controller 5 may include a plurality of semiconductor chips. The memory controller 5 controls the non-volatile memory 7 based on a request from the host 2. The memory controller 5 secondarily uses the volatile memory 6 in controlling the non-volatile memory 7.

Specifically, for example, the memory controller 5 executes a write process of writing data to the non-volatile memory 7 based on a write command from the host 2. The memory controller 5 executes a read process of reading data written in the write process from the non-volatile memory 7 based on a read command from the host 2. Then, the memory controller 5 gathers information regarding the number of accesses to data (or a logical address associated with the data) as telemetry, and notifies the host 2 of the information in a timely manner.

The volatile memory 6 is, for example, a dynamic random access memory (DRAM). The volatile memory 6 stores various types of information in execution of the write process, the read process, and the telemetry transmission process. Details of the information stored in the volatile memory 6 will be described later.

The non-volatile memory 7 is, for example, a NAND flash memory. The non-volatile memory 7 includes a plurality of memory cells. Each of the memory cells is an element that stores data in a non-volatile manner. The memory cells are associated with physical address spaces.

1.1.3 Memory Controller

Next, an internal configuration of the memory controller 5 will be described.

(Hardware Configuration)

First, a hardware configuration of the memory controller 5 will be described with continuous reference to FIG. 1. As illustrated in FIG. 1, the memory controller 5 includes a control circuit 11, a host interface circuit (host I/F) 12, a volatile memory interface circuit (VM I/F) 13, and a non-volatile memory interface circuit (NVM I/F) 14. The functions of the control circuit 11, the host interface circuit 12, the volatile memory interface circuit 13, and the non-volatile memory interface circuit 14 described below can be implemented by dedicated hardware, a processor that executes a program, or any combination thereof.

The control circuit 11 is a circuit that controls the entire memory controller 5. The control circuit 11 includes, for example, a processor such as a central processing unit (CPU), a read only memory (ROM), and a random access memory (RAM).

The host interface circuit 12 is hardware that manages communication between the memory controller 5 and the host 2. The host interface circuit 12 is connected to the host 2 via a host bus.

The volatile memory interface circuit 13 is hardware that manages communication between the memory controller 5 and the volatile memory 6. The volatile memory interface circuit 13 is connected to the volatile memory 6 via a memory bus BUS.

The non-volatile memory interface circuit 14 is hardware that manages communication between the memory controller 5 and the non-volatile memory 7. The non-volatile memory interface circuit 14 communicates with the non-volatile memory 7 in accordance with, for example, a single data rate (SDR) interface, a toggle double data rate (DDR) interface, or an open NAND flash interface (ONFI).

(Functional Configuration)

Figure 2:
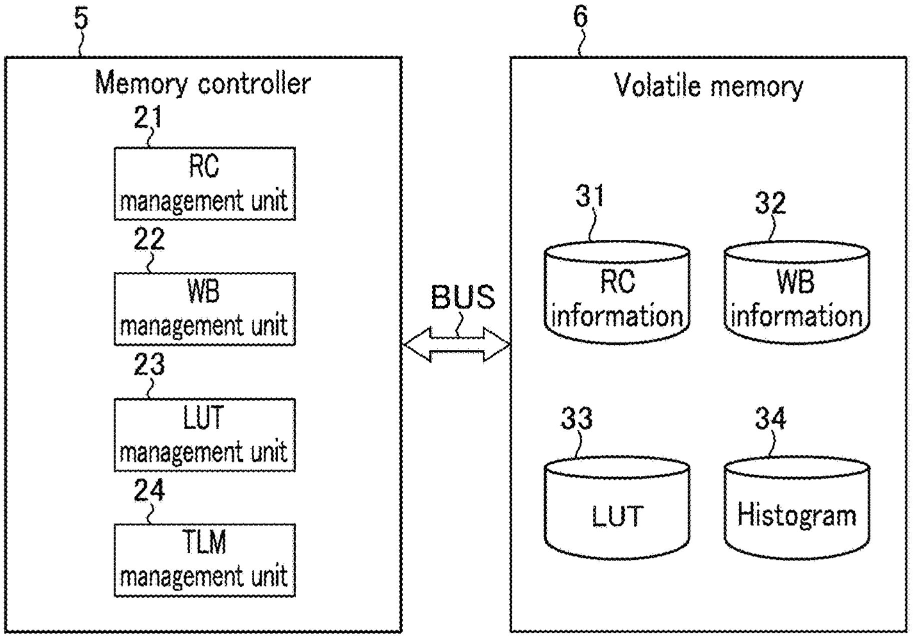
FIG. 2 is a block diagram illustrating an example of a relationship between a functional configuration of a memory controller and various types of information stored in a volatile memory according to the first embodiment.

Next, a functional configuration of the memory controller 5 will be described with reference to FIG. 2. FIG. 2 is a block diagram illustrating an example of a relationship between the functional configuration of the memory controller and the various types of information stored in the volatile memory according to the first embodiment. As illustrated in FIG. 2, the memory controller 5 functions as a read cache (RC) management unit 21, a write buffer (WB) management unit 22, a look up table (LUT) management unit 23, and a telemetry (TLM) management unit 24. The volatile memory 6 stores RC information 31, WB information 32, an LUT 33, and a histogram 34.

The RC management unit 21 manages a storage destination of data having a high access frequency in the memory system 3. Specifically, the RC management unit 21 stores data having a high access frequency as the RC information 31 in a storage area having a latency shorter than that of the non-volatile memory 7 (for example, a cache space in the volatile memory 6). The cache space may also be referred to a cache address space or a cache address range. Then, upon reception of a read command for the data having a high access frequency, the RC management unit 21 accesses the cache space instead of the non-volatile memory 7. As a result, a response to the host 2 with a shorter latency is realized.

The WB management unit 22 manages a size of data to be written to the non-volatile memory 7 in one write process. Specifically, the WB management unit 22 stores the data as the WB information 32 in a storage area (for example, a buffer area in the volatile memory 6) until data received from the host 2 reaches a predetermined size. Then, as the buffered data reaches a predetermined size, the WB management unit 22 writes the data in the non-volatile memory 7. As a result, more efficient data write is realized.

The LUT management unit 23 associates a logical address with a physical address in the memory system 3. Specifically, the LUT management unit 23 associates an address of a memory cell in which data is stored (physical address) with a logical address of the data. The LUT management unit 23 generates the LUT 33 in order to manage a set of a logical address and a physical address associated with the same data. The LUT management unit 23 stores the generated LUT 33 in the volatile memory 6.

The TLM management unit 24 manages generation and transmission of telemetry information in the telemetry transmission process. Specifically, the TLM management unit 24 counts the number of accesses to the memory space for each measurement unit either in response to a request from the host 2 or periodically. The TLM management unit 24 stores the number of accesses as the histogram 34 in the volatile memory 6.

As described above, while the RC management unit 21, the WB management unit 22, and the LUT management unit 23 manage processing and information necessary for controlling the non-volatile memory 7, the TLM management unit 24 manages processing and information having relatively low importance. On the other hand, the RC management unit 21, the WB management unit 22, the LUT management unit 23, and the TLM management unit 24 access the volatile memory 6 via the common memory bus BUS in managing the RC information 31, the WB information 32, the LUT 33, and the histogram 34, respectively. Therefore, it is preferable that the number of accesses from the TLM management unit 24 to the volatile memory 6 per unit time be suppressed to such an extent that the accesses from the RC management unit 21, the WB management unit 22, and the LUT management unit 23 to the volatile memory 6 are not hindered by the accesses from the TLM management unit 24 to the volatile memory 6.

Hereinafter, the number of accesses per unit time from the memory controller 5 to the volatile memory 6 is also referred to as a "band". The ratio of the number of accesses per unit time from the TLM management unit 24 to the volatile memory 6 in the band is also referred to as a "load on the band".

FIG. 3 is a block diagram illustrating an example of a relationship between the functional configuration of the TLM management unit included in the memory controller and the histogram which is one of the various types of information stored in the volatile memory according to the first embodiment. As illustrated in FIG. 3, the TLM management unit 24 includes an access map generation unit 41, a hot address detection unit 42, and a histogram generation unit 43.

The access map generation unit 41 includes a mapping unit 51. In addition, the access map generation unit 41 stores an access map 52.

The mapping unit 51 determines presence or absence of access to the memory space by using a logical address included in a command from the host 2 (hereinafter, also referred to as a command address or simply an address). The mapping unit 51 stores a result of the determination in the access map 52. Here, the command is, for example, the read command, the write command, or the like.

FIG. 4 is a diagram illustrating an example of a data structure of the access map stored in the memory controller according to the first embodiment. FIG. 4 illustrates a correspondence between the memory space in the non-volatile memory 7 and each entry of the access map 52.

As illustrated in FIG. 4, the memory space is divided into a plurality of sub-memory spaces each of which is associated with a measurement unit based on a command address. In the access map 52, a plurality of access detection bits respectively associated with the plurality of sub memory spaces are stored. A data size of one access detection bit is, for example, one bit. That is, in a case where the measurement unit for a 512 GB memory space is 4 KB, a data size of the access map 52 is 512 GB/4 KB=128 Mbit=16 MB. The access map 52 is stored in, for example, a static random access memory (SRAM) in the memory controller 5.

If the access detection bit indicates "0", it indicates that no access has occurred to the corresponding sub-memory space. If the access detection bit indicates "1", it indicates that an access has occurred in the corresponding sub-memory space.

In the example of FIG. 4, access detection bits indicating "1", "0", and "1" are allocated to the sub-memory spaces corresponding to the logical addresses "0x1000", "0x2000", and "0x3000", respectively. It can be seen that, in this case, by referring to the access map 52, accesses have occurred to the sub-memory spaces corresponding to the logical addresses "0x1000" and "0x3000", but no access has occurred to the sub-memory space corresponding to the logical address "0x2000".

Referring back to FIG. 3, the functional configuration of the TLM management unit 24 will be described.

The hot address detection unit 42 includes a compression unit 61 and a determination unit 62. In addition, the hot address detection unit 42 stores hot detection information 63 and a hot list 64.

The compression unit 61 compresses the command address into a hash value. The compression unit 61 sends the generated hash value to the determination unit 62.

FIG. 5 is a diagram illustrating an example of a data structure of hot detection information stored in the memory controller according to the first embodiment. FIG. 5 illustrates a correspondence between the memory space in the non-volatile memory 7 and each entry of the hot detection information 63.

As shown in FIG. 5, the hot detection information 63 has a plurality of entries. Each of the entries is associated with a set of sub-memory spaces that is a part of the plurality of sub-memory spaces. The set of sub-memory spaces associated with the same entry corresponds to the same hash value. The hot detection information 63 is stored in, for example, an SRAM in the memory controller 5.

Each entry forming the hot detection information 63 includes, for example, a set of an address and a probability count value. In a storage area of the address, a logical address indicating any one sub-memory space of the set of sub-memory spaces serving as a generation source of the hash value corresponding to the entry is stored. In the example of FIG. 5, a logical address "0x30000" is stored in an entry corresponding to a set of sub-memory spaces including logical addresses "0x00000", "0x10000", "0x20000", "0x30000", . . . , and "0xF0000".

The probability count value is used as an indicator of an access frequency to a corresponding logical address. The probability count value stochastically increases in occurrence of an access to the corresponding logical address. That is, the higher the probability count value is, the higher the access frequency to the corresponding logical address becomes.

Referring back to FIG. 3, the functional configuration of the TLM management unit 24 will be described.

The determination unit 62 refers to the hot detection information 63, and reads a set of the logical address and the probability count value from entries corresponding to the hash value. The determination unit 62 determines whether or not the command address matches the logical address that has been read from the hot detection information 63. If the command address matches the logical address that has been read from the hot detection information 63, the determination unit 62 stochastically determines whether or not to count up the probability count value corresponding to the logical address. As a result of the stochastic determination process, in a case where it is determined to count up the probability count value, the determination unit 62 counts up the probability count value and then writes back the probability count value to the hot detection information 63.

Here, the description "stochastically determines whether or not to count up the probability count value" means that, for example, the determination unit 62 determines the probability of counting up the probability count value according to a magnitude of the probability count value, and determines whether or not to count up the probability count value based on the determined probability. For example, the probability of counting up the probability count value is set to decrease as the probability count value is larger.

In a case where the command address and the logical address that has been read from the hot detection information 63 are different, the determination unit 62 stochastically determines whether or not to replace (change) the logical address stored in the hot detection information 63 with the command address. Here, the description "stochastically determines whether or not to replace the logical address with the command address" means that, for example, the determination unit 62 determines the probability of replacement of the logical address with the command address according to the magnitude of the probability count value, and determines whether or not to replace the logical address with the command address based on the determined probability. For example, the probability of executing the replacement is set to decrease as the probability count value is larger. As a result of the stochastic determination process, in a case where it is determined that the logical address to be stored in the hot detection information 63 is to be replaced with the command address, the determination unit 62 changes (overwrites) the logical address stored in the hot detection information 63 to the command address, and changes (overwrites) the value of the corresponding probability count value to "1". In a case where it is determined that the logical address to be stored in the hot detection information 63 is not replaced with the command address, the determination unit 62 maintains the information stored in the hot detection information 63.

Furthermore, the determination unit 62 determines whether or not the probability count value is equal to or greater than a threshold value. If the probability count value is equal to or greater than the threshold value, the determination unit 62 stores the corresponding logical address in the hot list 64. If the probability count value is less than the threshold value, the determination unit 62 does not change the information stored in the hot list 64.

Figure 6:
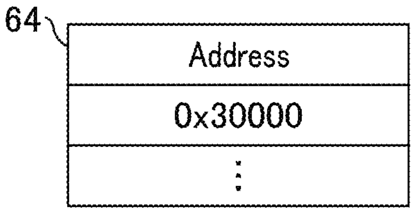
FIG. 6 is a diagram illustrating an example of a data structure of a hot list stored in the memory controller according to the first embodiment.

FIG. 6 is a diagram illustrating an example of a data structure of a hot list stored in the memory controller according to the first embodiment.

As illustrated in FIG. 6, the hot list 64 has a plurality of entries. A logical address is stored in each of the entries. The example of FIG. 6 shows a case where the probability count value corresponding to the logical address "0x30000" becomes equal to or greater than the threshold value. In such a case, the determination unit 62 stores the logical address "0x30000" in the hot list 64. The hot list 64 is stored in, for example, an SRAM in the memory controller 5.

Referring back to FIG. 3, the functional configuration of the TLM management unit 24 will be described.

The histogram generation unit 43 includes a filter unit 71 and an update unit 72.

The filter unit 71 filters the command address using the logical address stored in the hot list 64. Specifically, the filter unit 71 refers to the hot list 64 and determines whether or not the same logical address as the command address is stored in the hot list 64. If the same logical address as the command address is stored in the hot list 64, the filter unit 71 stops sending the command address to the update unit 72. If the same logical address as the command address is not stored in the hot list 64, the filter unit 71 sends the command address to the update unit 72.

Upon reception of the command address from the filter unit 71, the update unit 72 refers to the histogram 34 in the volatile memory 6 and reads the number of accesses corresponding to the command address. After counting up the read number of accesses, the update unit 72 writes back the number of accesses that has been counted up to the histogram 34.

Figure 7:
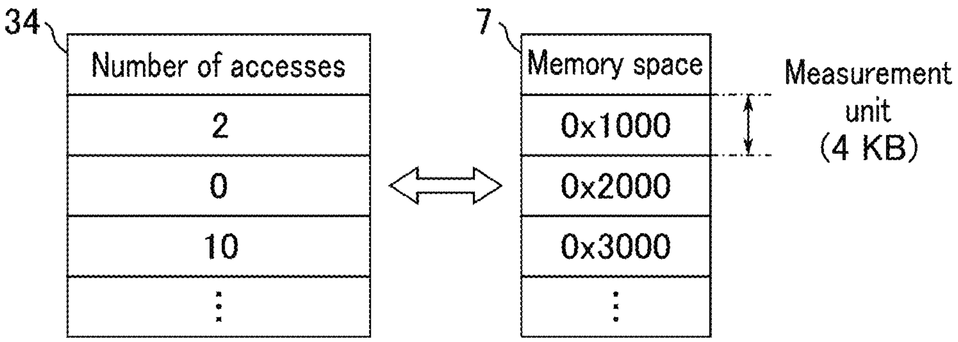
FIG. 7 is a diagram illustrating an example of a data structure of the histogram stored in the volatile memory according to the first embodiment.

FIG. 7 is a diagram illustrating an example of a data structure of a histogram stored in the volatile memory according to the first embodiment. FIG. 7 illustrates a correspondence between the memory space in the nonvolatile memory 7 and each entry of the histogram 34.

As illustrated in FIG. 7, in the histogram 34, a plurality of numbers of accesses respectively associated with a plurality of sub-memory spaces are stored. The data size of one number of accesses is, for example, 8 bits. That is, in a case where the measurement unit for the 512 GB memory space is 4 KB, a data size of the histogram 34 is 512 GB/4 KB×8 bits=128 MB.

In the example of FIG. 7, the numbers of accesses indicating "2", "0", and "10" are allocated to the sub memory spaces corresponding to the logical addresses "0x1000", "0x2000", and "0x3000", respectively. It can be seen that, in this case, by referring to the histogram 34, accesses of 2 times and 10 times have occurred in the sub-memory spaces corresponding to the logical addresses "0x1000" and "0x3000", respectively, but no access has occurred to the sub-memory space corresponding to the logical address "0x2000".

1.2 Operation

Next, an operation in the memory system according to the first embodiment will be described.

1.2.1 Overall Process

FIG. 8 is a flowchart illustrating an example of an overall process from generation to transmission of telemetry information to the host 2 in the memory system according to the first embodiment.

As illustrated in FIG. 8, upon reception of a telemetry transmission request from the host or periodically (start), the memory controller 5 initializes the access map 52, the hot detection information 63, the hot list 64, and the histogram 34 (S1).

After the processing of S1, the memory controller 5 waits until the command address is received or the count period of the histogram 34 ends (S2).

After the processing of S2, the memory controller 5 determines whether or not a command address has been received (S3).

If the command address is received (S3; yes), the access map generation unit 41 executes an access map update process (S4). The access map update process updates the access map 52. Details of the access map update process will be described later.

Subsequently, the hot address detection unit 42 executes a hot list update process (S5). The hot detection information 63 and the hot list 64 are updated by the hot list update process. Details of the hot list update process will be described later.

Subsequently, the histogram generation unit 43 executes a histogram update process (S6). The histogram update process updates the histogram 34. Details of the histogram update process will be described later.

After the processing of S6, the memory controller 5 determines whether the count period of the histogram 34 has ended (S7). If the count period of the histogram 34 has not ended after the processing of S6 (S7; no), the memory controller 5 waits until the command address is received or the count period of the histogram 34 ends (S2). After the processing of S2, the subsequent processing of S3 to S7 is executed until the count period of the histogram 34 ends.

If the command address has not been received (that is, the processing of S2 has proceeded by the end of the count period) (S3; no), or if the count period of the histogram 34 ends after the processing of S6 (S7; yes), the memory controller 5 executes a telemetry transmission process (S8). The number of accesses in the histogram 34 is transmitted to the host 2 by the telemetry transmission process.

Upon completion of the processing of S8, the entire process ends (end).

Note that, in the example of FIG. 8, a case where the processing of S4 to S6 is executed in series in this order has been described, but the present invention is not limited thereto. For example, the processing of S4 to S6 may be executed in parallel in response to the reception of the command address.

1.2.2 Access Map Update Process

FIG. 9 is a flowchart illustrating an example of an access map update process in the memory system according to the first embodiment. The processing of S11 to S12 illustrated in FIG. 9 corresponds to the processing of S4 in FIG. 8.

As illustrated in FIG. 9, upon reception of a command address (start), the mapping unit 51 reads an access detection bit corresponding to the command address from the access map 52, and determines whether a value of the access detection bit is "0" (S11).

If the value of the access detection bit is "0" (S11; yes), the mapping unit 51 sets the value of the access detection bit to "1" and writes the value back to the access map 52 (S12).

If the value of the access detection bit is "1" (S11; no), or after the processing of S12, the access map update process ends (end).

1.2.3 Hot List Update Process

FIG. 10 is a flowchart illustrating an example of a hot list update process in the memory system according to the first embodiment. The processing of S21 to S29 illustrated in FIG. 10 corresponds to the processing of S5 in FIG. 8.

As illustrated in FIG. 10, upon reception of the command address (start), the compression unit 61 generates a hash value based on the command address (S21).

The determination unit 62 refers to the hot detection information 63 and specifies a set of the logical address and the probability count value corresponding to the hash value generated in the processing of S21 (S22).

The determination unit 62 determines whether an address conflict has occurred between the command address and the logical address specified in the processing of S22 (S23). Here, the address conflict means that two logical addresses are different from each other.

If an address conflict has occurred (S23; yes), the determination unit 62 stochastically determines whether or not to execute replacement of the logical address stored in the hot detection information 63 based on the magnitude of the probability count value specified in the processing of S22 (S24).

If it is determined to execute replacement of the logical address stored in the hot detection information 63 (S24; yes), the determination unit 62 replaces the logical address specified in the processing of S22 with the command address, sets the probability count value to "1", and writes back to the hot detection information 63 (S25).

If no address conflict has occurred (S23; no), the determination unit 62 stochastically determines whether or not to count up the probability count value based on the magnitude of the probability count value (S26).

If it is determined that the probability count value is to be counted up (S26; yes), the determination unit 62 counts up the probability count value specified in the processing of S22 and writes it back to the hot detection information 63 (S27).

After the processing of S27, the determination unit 62 determines whether or not the probability count value that has been counted up is equal to or greater than a threshold value (S28).

If the probability count value is equal to or greater than the threshold value (S28; yes), the determination unit 62 registers the logical address specified in the processing of S22 in the hot list 64 (S29).

If it is determined that the replacement of the logical address stored in the hot detection information 63 is not to be executed (S24; no), if it is determined the probability count value is not to be counted up after the processing of S25 (S26; no), if the probability count value is less than the threshold value (S28; no), or after the processing of S29, the hot list update process ends (end).

Figure 11:
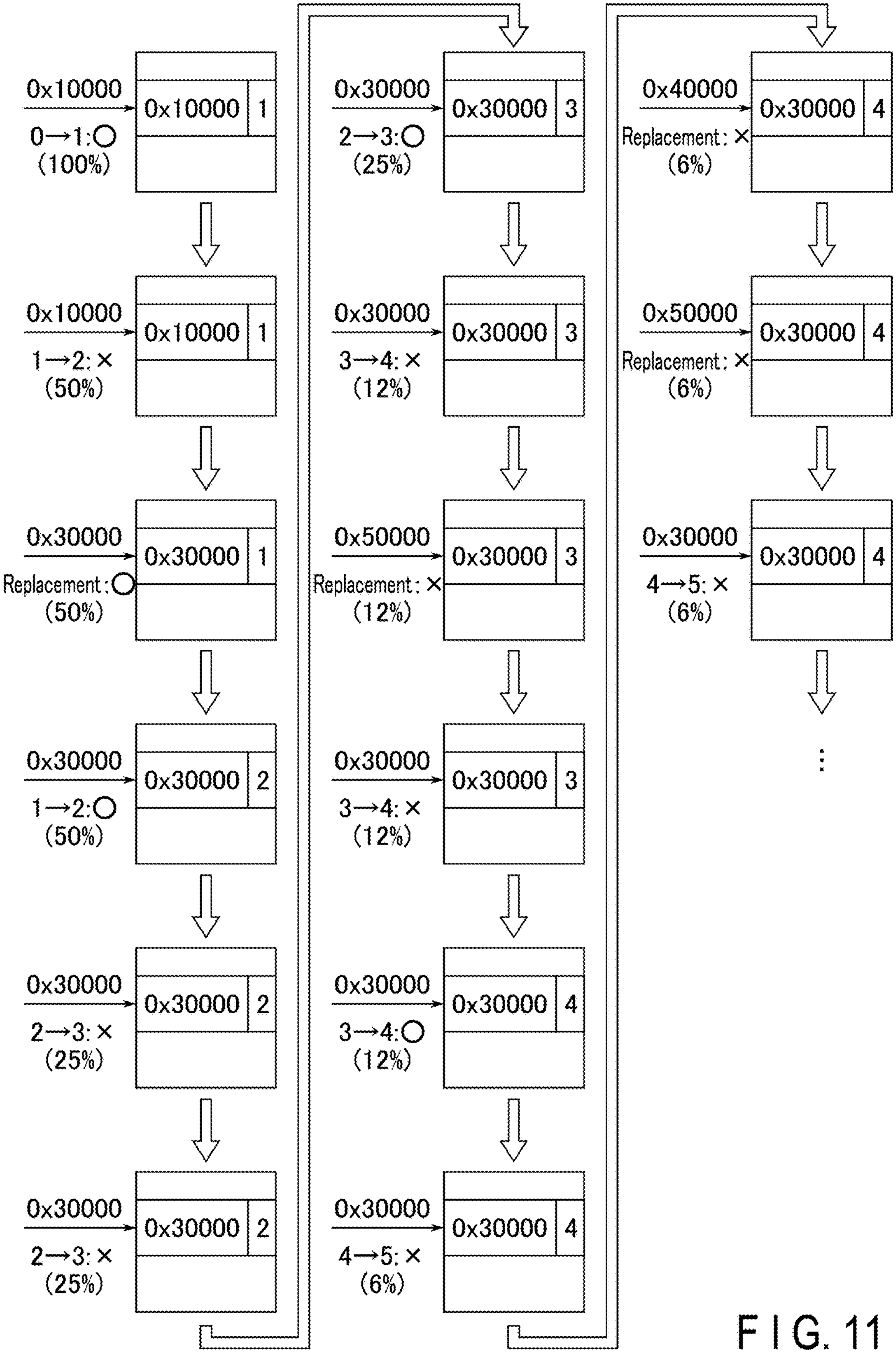
FIG. 11 is a diagram illustrating an example of the hot list update process in the memory system according to the first embodiment.

FIG. 11 is a diagram illustrating an example of a hot list update process in the memory system according to the first embodiment. The example of FIG. 11 shows a transition of the logical address and the probability count value stored in the entry corresponding to the sets of sub-memory spaces including the logical addresses "0x00000", "0x10000", "0x20000", "0x30000", . . . , and "0xF0000" in the hot detection information 63.

Note that FIG. 11 illustrates, as an example, a case where the probabilities at which the count-up and the replacement are executed in the stochastic determination process are halved from 100% to 50%, 25%, 12%, 6%, . . . each time the probability count value increases from "0", to "1", "2", "3", "4", . . . .

As illustrated in FIG. 11, first, upon reception of the command address "0x10000", the determination unit 62 stores a set of the logical address "0x10000" and the probability count value "1" in the hot detection information 63.

Next, upon reception of the same command address "0x10000" as the logical address stored in the target entry, the determination unit 62 determines whether or not to count up the probability count value. Here, since the probability count value is "1", the probability that it is determined to count up is 50%. In the example of FIG. 11, the determination unit 62 determines not to count up, and maintains the information stored in the target entry.

Next, upon reception of the command address "0x30000" different from the logical address stored in the target entry, the determination unit 62 determines whether or not to execute replacement of the logical address. Here, since the probability count value is "1", the probability that it is determined to execute replacement is 50%. In the example of FIG. 11, the determination unit 62 determines to replace, and replaces the logical address stored in the target entry with the command address "0x30000", and sets the probability count value to "1".

Next, upon reception of the same command address "0x30000" as the logical address stored in the target entry, the determination unit 62 determines whether or not to count up the probability count value. Here, since the probability count value is "1", the probability that it is determined to count up is 50%. In the example of FIG. 11, the determination unit 62 determines to count up, and sets the probability count value to "2".

Next, upon reception of the same command address "0x30000" as the logical address stored in the target entry, the determination unit 62 determines whether or not to count up the probability count value. Here, since the probability count value is "2", the probability that it is determined to count up is 25%. In the example of FIG. 11, the determination unit 62 determines not to count up, and maintains the information stored in the target entry. Such an operation is repeated twice.

Next, upon reception of the same command address "0x30000" as the logical address stored in the target entry, the determination unit 62 determines whether or not to count up the probability count value. Here, since the probability count value is "2", the probability that it is determined to count up is 25%. In the example of FIG. 11, the determination unit 62 determines to count up, and sets the probability count value to "3".

Next, upon reception of the same command address "0x30000" as the logical address stored in the target entry, the determination unit 62 determines whether or not to count up the probability count value. Here, since the probability count value is "3", the probability that it is determined to count up is 12%. In the example of FIG. 11, the determination unit 62 determines not to count up, and maintains the information stored in the target entry.

Next, upon reception of the command address "0x50000" different from the logical address stored in the target entry, the determination unit 62 determines whether or not to execute replacement of the logical address. Here, since the probability count value is "3", the probability that it is determined to execute replacement is 12%. In the example of FIG. 11, the determination unit 62 determines not to execute replacement, and maintains the information stored in the target entry.

Next, upon reception of the same command address "0x30000" as the logical address stored in the target entry, the determination unit 62 determines whether or not to count up the probability count value. Here, since the probability count value is "3", the probability that it is determined to count up is 12%. In the example of FIG. 11, the determination unit 62 determines not to count up, and maintains the information stored in the target entry.

Next, upon reception of the same command address "0x30000" as the logical address stored in the target entry, the determination unit 62 determines whether or not to count up the probability count value. Here, since the probability count value is "3", the probability that it is determined to count up is 12%. In the example of FIG. 11, the determination unit 62 determines to count up, and sets the probability count value to "4".

Next, upon reception of the same command address "0x30000" as the logical address stored in the target entry, the determination unit 62 determines whether or not to count up the probability count value. Here, since the probability count value is "4", the probability that it is determined to count up is 68. In the example of FIG. 11, the determination unit 62 determines not to count up, and maintains the information stored in the target entry.

Next, upon reception of the command address "0x40000" different from the logical address stored in the target entry, the determination unit 62 determines whether or not to execute replacement of the logical address. Here, since the probability count value is "4", the probability that it is determined to execute the replacement is 6%. In the example of FIG. 11, the determination unit 62 determines not to execute replacement, and maintains the information stored in the target entry.

Next, upon reception of the command address "0x50000" different from the logical address stored in the target entry, the determination unit 62 determines whether or not to execute replacement of the logical address. Here, since the probability count value is "4", the probability that it is determined to execute the replacement is 6%. In the example of FIG. 11, the determination unit 62 determines not to execute replacement, and maintains the information stored in the target entry.

Next, upon reception of the same command address "0x30000" as the logical address stored in the target entry, the determination unit 62 determines whether or not to count up the probability count value. Here, since the probability count value is "4", the probability that it is determined to count up is 6%. In the example of FIG. 11, the determination unit 62 determines not to count up, and maintains the information stored in the target entry.

As described above, in a case where the probability count value is small, the information stored in the hot detection information 63 is relatively easily replaced and easily counted up. On the other hand, in a case where the probability count value is large, the information stored in the hot detection information 63 is relatively difficult to be replaced and to be counted up. Then, in a case where the probability count value increases up to the threshold value or more, it is determined that access is frequently performed, and the probability count value is registered in the hot list 64.

1.2.4 Histogram Update Process

Figure 12:
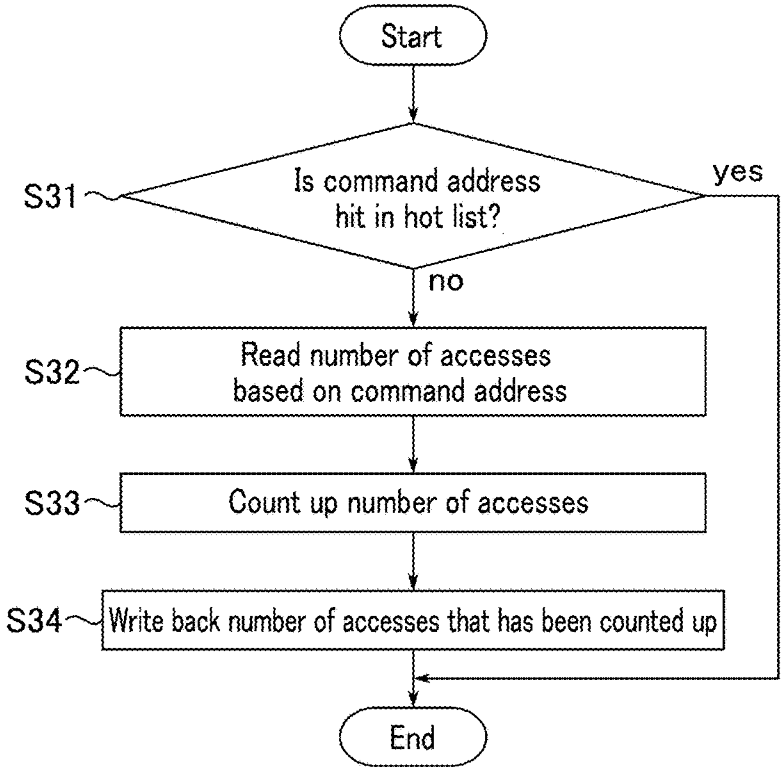
FIG. 12 is a flowchart illustrating an example of a histogram update process in the memory system according to the first embodiment.

FIG. 12 is a flowchart illustrating an example of a histogram update process in the memory system according to the first embodiment. The processing of S31 to S34 illustrated in FIG. 12 corresponds to the processing of S6 in FIG. 8.

As illustrated in FIG. 12, upon reception of the command address (start), the filter unit 71 refers to the hot list 64 and determines whether or not the command address is hit (S31).

If the command address is not hit (that is, there is no command address in the hot list 64) (S31; no), the update unit 72 reads the number of accesses from the histogram 34 based on the command address (S32).

The update unit 72 counts up the number of accesses read in the processing of S32 (S33).

The update unit 72 writes back the number of accesses that has been counted up in the processing of S33 to the histogram 34 (S34).

If the command address is hit (that is, the command address exists in the hot list 64) (S31; yes), or after the processing of S34, the histogram update process ends (end).

1.2.5 Telemetry Transmission Process

Figure 13:
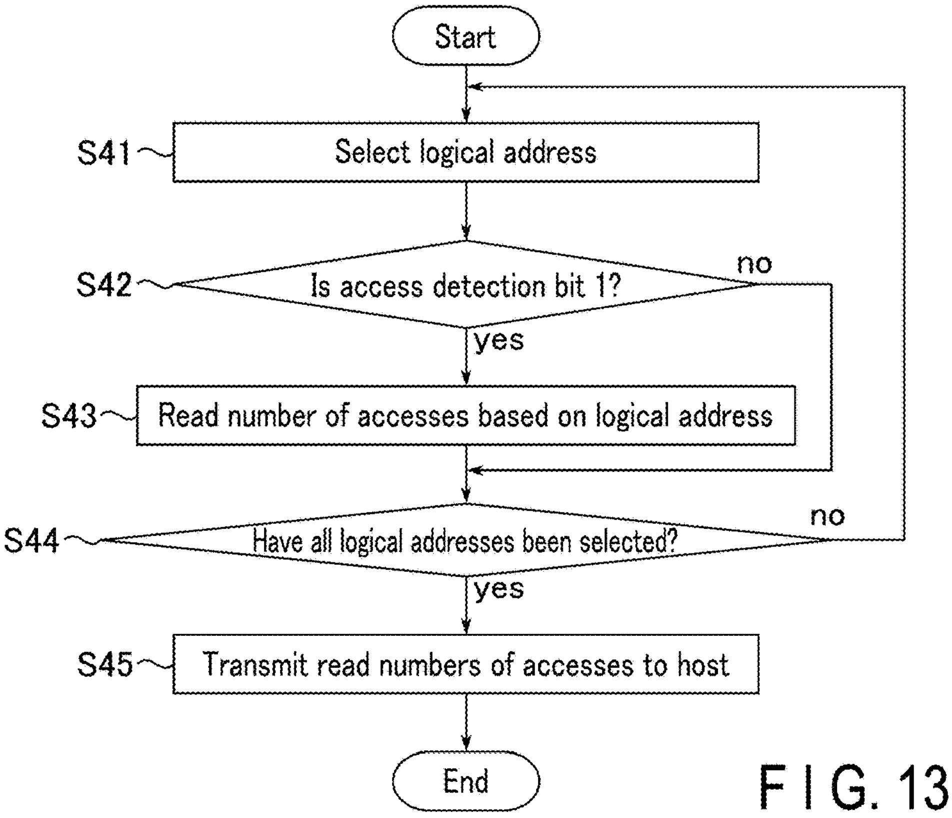
FIG. 13 is a flowchart illustrating an example of a telemetry transmission process in the memory system according to the first embodiment.

FIG. 13 is a flowchart illustrating an example of a telemetry transmission process in the memory system according to the first embodiment. The processing of S41 to S45 illustrated in FIG. 13 corresponds to the processing of S8 in FIG. 8.

As illustrated in FIG. 13, upon completion of the count period of the histogram 34 (start), the memory controller 5 selects a logical address from the memory space (S41).

The memory controller 5 refers to the access map 52 and determines whether or not the access detection bit corresponding to the logical address selected in the processing of S41 is "1" (S42).

If the access detection bit is "1" (S42; yes), the memory controller 5 reads the number of accesses from the histogram 34 based on the logical address selected in the processing of S41 (S43). The read number of accesses is temporarily stored in the memory controller 5 as part of telemetry transmitted to the host 2.

If the access detection bit is "0" (S42; no), or after the processing of S43, the memory controller 5 determines whether or not all the logical addresses in the memory space have been selected (S44).

If there is an unselected logical address (S44; no), the memory controller 5 selects the unselected logical address from the memory space (S41). Then, the subsequent processing of S42 to S44 is executed. In this manner, the processing of S41 to S44 is repeated until all the logical addresses are selected.

If all the logical addresses have been selected (S44; yes), the memory controller 5 transmits all the numbers of accesses read in the processing of S43 to the host 2 as telemetry (S45).

Upon completion of the processing of S45, the telemetry transmission process ends (end).

1.3 Effects According to First Embodiment

According to the first embodiment, the memory controller 5 manages the number of accesses to the non-volatile memory 7 for each measurement unit obtained by dividing the logical address, and stores the number of accesses in the volatile memory 6 as the histogram 34. In managing the number of accesses, in a case where a command is received from the host 2, the update unit 72 included in the histogram generation unit 43 skips reading of the number of accesses to the command address from the volatile memory 6 in a case where the condition is satisfied. In a case where the condition is not satisfied, the update unit 72 reads the number of accesses to the command address from the volatile memory 6 and changes the number of accesses stored in the histogram 34. Specifically, in a case where the command address is not registered in the hot list 64, the update unit 72 reads the number of accesses corresponding to the command address from the histogram 34, counts up the read number of accesses, and writes back the number of accesses that has been counted up to the histogram 34. In addition, in a case where the command address is registered in the hot list 64, the update unit 72 skips reading of the number of accesses corresponding to the command address from the histogram 34, counting up of the read number of accesses, and writing back of the number of accesses that has been counted up to the histogram 34. As a result, it is possible to suppress frequent update of the number of accesses to the command address that can be grasped in advance as being hot. Therefore, a load on the band of the volatile memory 6 can be suppressed. Therefore, it is possible to suppress a decrease in performance due to the memory system 3 managing telemetry.

In addition, the hot address detection unit 42 stores, as the hot detection information 63, a set of a logical address and a probability count value referred to by a hash value generated by compressing the logical address. The determination unit 62 of the hot address detection unit 42 determines whether or not to register a logical address corresponding to the probability count value in the hot list 64 based on whether or not the probability count value is equal to or greater than a threshold value. As a result, it is possible to suppress the capacity of the SRAM required for the hot detection information 63 as compared with a case of managing the probability count value for each logical address.

In addition, in a case where the logical address stored in the hot detection information 63 corresponding to the hash value generated based on the command address is different from the command address, the determination unit 62 stochastically determines whether or not to replace the address based on the probability count value. In a case where the logical address stored in the hot detection information 63 corresponding to the hash value generated based on the command address matches the command address, the determination unit 62 stochastically determines whether or not to count up the probability count value based on the probability count value. The probability of replacement and the probability of counting up are set to be lower as the probability count value is larger. As a result, a logical address having a higher access frequency can be easily stored in the hot detection information 63 with a larger probability count value. Therefore, a logical address having a higher access frequency can be more easily registered in the hot list 64.

2. Second Embodiment

Next, a memory system according to a second embodiment will be described. The second embodiment is different from the first embodiment in that a histogram 34 is generated based on an access map 52. In the following description, a configuration and an operation different from those of the first embodiment will be mainly described. Description of configurations and operations equivalent to those of the first embodiment will be omitted as appropriate.

2.1 Functional Configuration of Memory Controller

FIG. 14 is a block diagram illustrating an example of a relationship between the functional configuration of the TLM management unit included in the memory controller and the histogram which is one of the various types of information stored in the volatile memory according to the second embodiment. FIG. 14 corresponds to FIG. 3 in the first embodiment. As illustrated in FIG. 14, a TLM management unit 24 may include an access map generation unit 41 and a histogram generation unit 43, and may not include a hot address detection unit 42.

The access map generation unit 41 includes a mapping unit 51. In addition, the access map generation unit 41 stores an access map 52.

The mapping unit 51 generates the access map 52 using the command address. The mapping unit 51 transmits the access map 52 that has been generated to histogram generation unit 43.

The histogram generation unit 43 includes a filter unit 71 and an update unit 72.

The filter unit 71 filters the command address using the access detection bit stored in the access map 52. Specifically, the filter unit 71 refers to the access map 52 and determines whether or not the access detection bit corresponding to the command address has transitioned from "0" to "1" by the command address. If the access detection bit transitions from "0" to "1", the filter unit 71 sends information indicating that it is not necessary to read the number of accesses from the histogram 34 to the update unit 72 together with the command address. If the access detection bit is already "1", the filter unit 71 sends information indicating that it is necessary to read the number of accesses from the histogram 34 to the update unit 72 together with the command address.

Upon reception of the information indicating that it is necessary to read the number of accesses from the histogram 34 together with the command address from the filter unit 71, the update unit 72 refers to the histogram 34 in the volatile memory 6 and reads the number of accesses corresponding to the command address. After counting up the read number of accesses, the update unit 72 writes back the number of accesses that has been counted up to the histogram 34.

On the other hand, upon reception of the information indicating that it is not necessary to read the number of accesses from the histogram 34 together with the command address from the filter unit 71, the update unit 72 writes "1" to the number of accesses corresponding to the command address without reading the number of accesses from the histogram 34.

2.2 Telemetry Transmission Process

FIG. 15 is a flowchart illustrating an example of an overall process from generation to transmission of the histogram 34 in the memory system according to the second embodiment. FIG. 15 corresponds to FIG. 8 in the first embodiment.

As illustrated in FIG. 15, upon reception of a telemetry transmission request from the host or periodically (start), a memory controller 5 initializes the access map 52 (S51). At this time, the memory controller 5 does not initialize the histogram 34. Therefore, the histogram 34 is in a state in which the number of accesses that has been counted up in the previous count period is stored.

After the processing of S51, the memory controller 5 waits until the command address is received or the count period of the histogram 34 ends (S52).

After the processing of S52, the memory controller 5 determines whether or not a command address has been received (S53).

If the command address is received (S53; yes), the access map generation unit 41 executes the access map update process (S54). The access map update process updates the access map 52. The access map update process in the second embodiment is equivalent to the access map update process in the first embodiment.

Subsequently, the histogram generation unit 43 executes a histogram update process (S55). The histogram update process updates the histogram 34. Details of the histogram update process will be described later.

After the processing of S55, the memory controller 5 determines whether or not the count period of the histogram 34 has ended (S56). If the count period of the histogram 34 has not ended after the processing of S56 (S56; no), the memory controller 5 waits until the command address is received or the count period of the histogram 34 ends (S52).

After the processing of S52, the subsequent processing of S53 to S56 is executed until the count period of the histogram 34 ends.

If the command address has not been received (that is, the processing of S52 has proceeded by the end of the count period) (S53; no), or if the count period of the histogram 34 ends after the processing of S55 (S56; yes), the memory controller 5 executes a telemetry transmission process (S57). The number of accesses in the histogram 34 is transmitted to the host 2 by the telemetry transmission process. The telemetry transmission process in the second embodiment is equivalent to the telemetry transmission process in the first embodiment.

Upon completion of the processing of S57, the entire process ends (end).

2.3 Histogram Update Process

Figure 16:
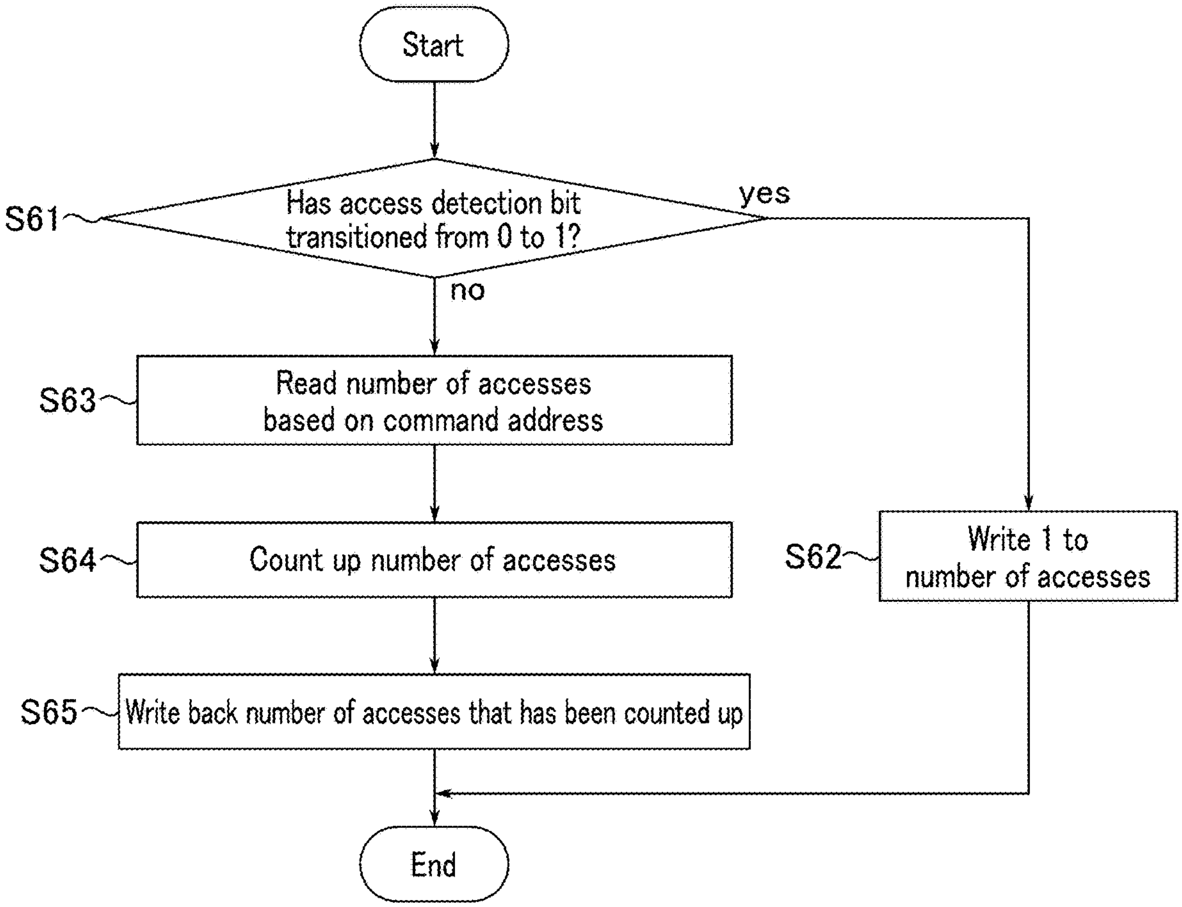
FIG. 16 is a flowchart illustrating an example of a histogram update process in the memory system according to the second embodiment.

FIG. 16 is a flowchart illustrating an example of a histogram update process in the memory system according to the second embodiment. The processing of S61 to S65 illustrated in FIG. 16 corresponds to the processing of S55 in FIG. 15.

As illustrated in FIG. 16, upon reception of the command address (start), the filter unit 71 refers to the access map 52, and determines whether or not the access detection bit corresponding to the command address has transitioned from "0" to "1" (S61).

If the access detection bit transitions from "0" to "1" (that is, the access to the command address has occurred for the first time in the count period) (S61; yes), the update unit 72 writes "1" in the number of accesses (S62). Note that the update unit 72 does not perform reading for confirming the number of accesses before writing "1" as the number of accesses.

If the access detection bit is already "1" (that is, this is not the first access to the command address in the count period) (S61; no), the update unit 72 reads the number of accesses from the histogram 34 based on the command address (S63).

The update unit 72 counts up the number of accesses read in the processing of S63 (S64).

The update unit 72 writes back the number of accesses that has been counted up in the processing of S64 to the histogram 34 (S65).

After the processing of S62 or after the processing of S65, the histogram update process ends (end).

2.4 Effects According to Second Embodiment

According to the second embodiment, the access map generation unit 41 stores the access detection bit indicating presence or absence of access to the logical address as the access map 52. The filter unit 71 of the histogram generation unit 43 determines whether or not the access to the logical address corresponding to the access detection bit is performed for the first time in the count period based on the access detection bit. Specifically, if the access detection bit transitions from "0" to "1" before and after the access to the command address, the filter unit 71 determines that the access is the first access. If the access detection bit is "1" before and after the access to the command address, the filter unit 71 determines that the access is not the first access. If it is determined that the access is not the first access, the update unit 72 reads the number of accesses corresponding to the command address from the histogram 34, counts up the read number of accesses, and writes back the number of accesses that has been counted up to the histogram 34. If it is determined that the access is the first access, the update unit 72 skips reading of the number of accesses corresponding to the command address from the histogram 34 and count up of the read number of accesses, and writes "1" to the number of accesses. As a result, the histogram 34 can be updated without being initialized for each count period. Therefore, a load on the band of the volatile memory 6 can be suppressed. Therefore, it is possible to suppress a decrease in performance due to the memory system 3 managing telemetry.

3. Modifications

Various modifications can be applied to the first embodiment and the second embodiment described above. Hereinafter, a configuration and a method different from those of the first embodiment will be mainly described. Description of a configuration and an operation equivalent to those of the first embodiment will be omitted as appropriate.

3.1 First Modification

In the first embodiment described above, the case where the update of the hot list 64 and the update of the histogram 34 are started at the same timing has been described, but the present invention is not limited thereto. For example, update of a histogram 34 may be started after a predetermined time has elapsed from the start of update of a hot list 64.

Figure 17:
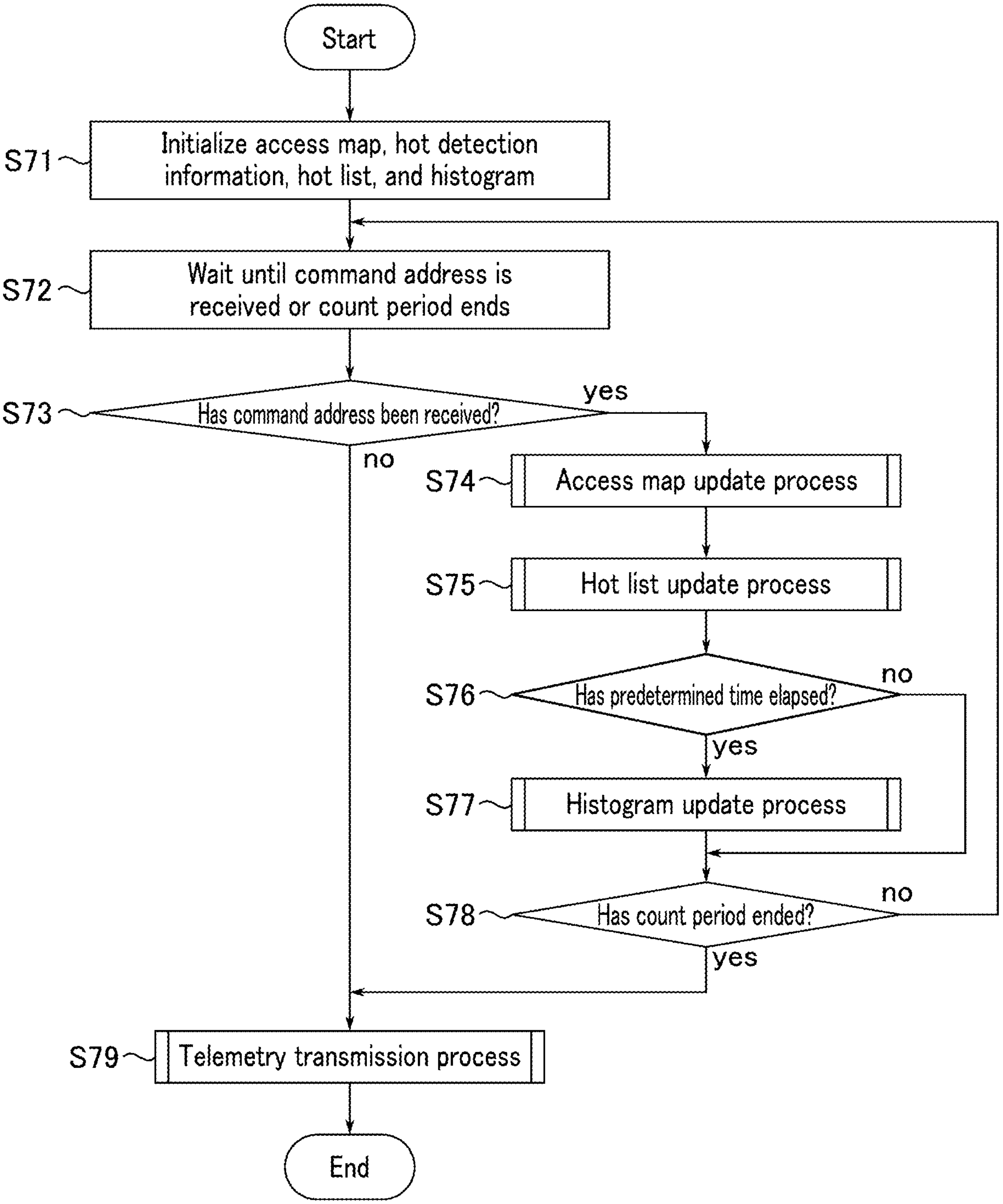
FIG. 17 is a flowchart illustrating an example of a telemetry transmission process in a memory system according to a first modification.

FIG. 17 is a flowchart illustrating an example of an overall process from generation to transmission of the histogram 34 in the memory system according to a first modification. FIG. 17 corresponds to FIG. 8 in the first embodiment.

As illustrated in FIG. 17, upon reception of a telemetry transmission request from the host or periodically (start), a memory controller 5 initializes an access map 52, a hot detection information 63, the hot list 64, and the histogram 34 (S71).

After the processing of S71, the memory controller 5 waits until the command address is received or the count period of the histogram 34 ends (S72).

After the processing of S72, the memory controller 5 determines whether or not a command address has been received (S73).

If the command address is received (S73; yes), an access map generation unit 41 executes the access map update process (S74). The access map update process updates the access map 52.

Subsequently, a hot address detection unit 42 executes a hot list update process (S75). The hot detection information 63 and the hot list 64 are updated by the hot list update process.

After the processing of S75, the memory controller 5 determines whether or not a predetermined time has elapsed from the start of the count period (S76). The predetermined time can be set to any time shorter than the count period.

If the predetermined time has elapsed (S76; yes), a histogram generation unit 43 executes a histogram update process (S77). The histogram update process updates the histogram 34.

If the predetermined time has not elapsed (S76; no), or after the processing of S77, the memory controller 5 determines whether or not the count period of the histogram 34 ends (S78). If the count period of the histogram 34 has not ended after the processing of S77 (S78; no), the memory controller 5 waits until the command address is received or the count period of the histogram 34 ends (S72). After the processing of S72, the subsequent processing of S73 to S78 is executed until the count period of the histogram 34 ends.

If the command address has not been received (that is, the processing of S72 has proceeded by the end of the count period) (S73; no), or if the count period of the histogram 34 ends after the processing of S77 (S78; yes), the memory controller 5 executes telemetry transmission process (S79). The number of accesses in the histogram 34 is transmitted to the host 2 by the telemetry transmission process.

Upon completion of the processing of S79, the entire process ends (end).

According to the first modification, the memory controller 5 starts the histogram update process after a predetermined period has elapsed from the start of the hot list update process. As a result, it is possible to suppress the histogram 34 from being updated before the command address determined to have a high access frequency is registered in the hot list 64. Therefore, a load on the band of the volatile memory 6 can be further suppressed.

3.2 Second Modification

In the first embodiment described above, the case where the logical address corresponding to the probability count value equal to or greater than a threshold value is registered in the hot list 64 has been described, but the present invention is not limited thereto. For example, a determination unit 62 may further stochastically determine whether or not to register the logical address in the hot list 64. Here, the description "stochastically determine whether or not to register the logical address in the hot list 64" means that, for example, the determination unit 62 determines the probability of registering the logical address in the hot list 64 according to the magnitude of the probability count value, and determines whether or not to register the logical address in the hot list 64 based on the determined probability.

Figure 18:
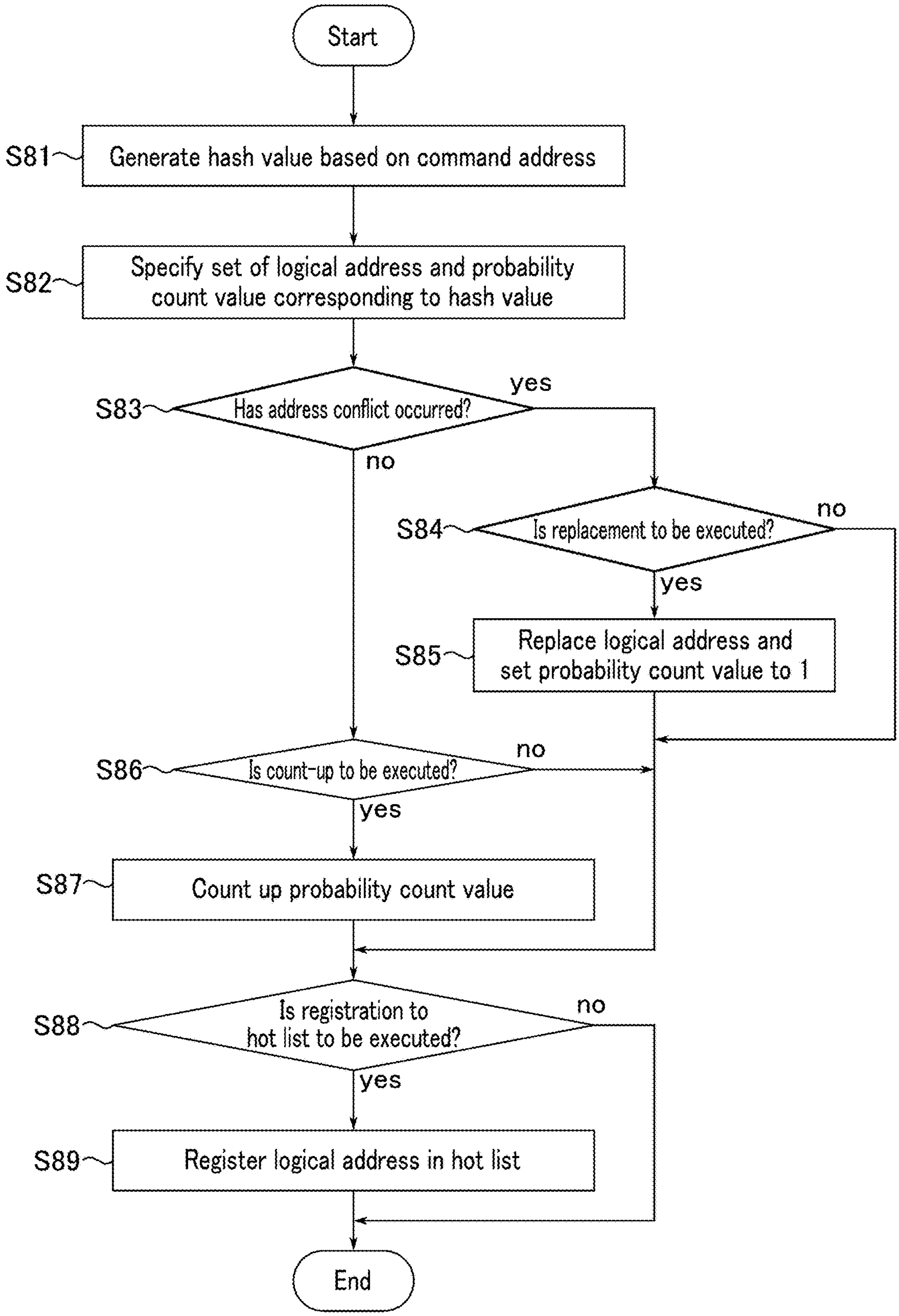
FIG. 18 is a flowchart illustrating an example of a hot list update process in a memory system according to a second modification.

FIG. 18 is a flowchart illustrating an example of a hot list update process in the memory system according to a second modification. FIG. 18 corresponds to FIG. 10 in the first embodiment.

As illustrated in FIG. 18, upon reception of the command address (start), a compression unit 61 generates a hash value based on the command address (S81).

The determination unit 62 refers to hot detection information 63 and specifies a set of the logical address and the probability count value corresponding to the hash value generated in the processing of S81 (S82).

The determination unit 62 determines whether an address conflict has occurred between the command address and the logical address specified in the processing of S82 (S83).

If an address conflict has occurred (S83; yes), the determination unit 62 stochastically determines whether or not to execute replacement of the logical address stored in the hot detection information 63 based on the magnitude of the probability count value specified in the processing of S82 (S84).

If it is determined to execute replacement of the logical address stored in the hot detection information 63 (S84; yes), the determination unit 62 replaces the logical address specified in the processing of S82 with the command address, sets the probability count value to "1", and writes back to the hot detection information 63 (S85).

If no address conflict has occurred (S83; no), the determination unit 62 stochastically determines whether or not to count up the probability count value based on the magnitude of the probability count value (S86).

If it is determined that the probability count value is to be counted up (S86; yes), the determination unit 62 counts up the probability count value specified in the processing of S82 and writes it back to the hot detection information 63 (S87).

If it is determined that the replacement of the logical address stored in the hot detection information 63 is not to be executed (S84; no), after the processing of S85, or after the processing of S87, the determination unit 62 stochastically determines whether or not to register the logical address that has been read in the processing of S82 in the hot list 64 (S88).

If it is determined to register the logical address in the hot list 64 (S88; yes), the determination unit 62 registers the logical address specified in the processing of S82 in the hot list 64 (S89).

If it is determined not to register the logical address in the hot list 64 (S88; no), or after the processing of S89, the hot list update process ends (end).

According to the second modification, the probability of registration in the hot list 64 can be increased as the probability count value increases. As a result, the registration of the logical address to the hot list 64 can be determined more stochastically.

3.3 Third Modification

In the first embodiment described above, the case where the logical address corresponding to the probability count value equal to or greater than a threshold value is registered in the hot list 64 has been described, but the present invention is not limited thereto. For example, a plurality of hot lists 64 may be generated for each probability count or for each group of probability counts.

FIG. 19 is a flowchart illustrating an example of a hot list update process in the memory system according to a third modification. FIG. 19 corresponds to FIG. 10 in the first embodiment.

As illustrated in FIG. 19, upon reception of the command address (start), a compression unit 61 generates a hash value based on the command address (S91).

The determination unit 62 refers to hot detection information 63 and reads a set of the logical address and the probability count value corresponding to the hash value generated in the processing of S91 (S92).

A determination unit 62 determines whether an address conflict has occurred between the command address and the logical address that has been read in the processing of S92 (S93).

If an address conflict has occurred (S93; yes), the determination unit 62 stochastically determines whether or not to execute replacement of the logical address stored in the hot detection information 63 based on the magnitude of the probability count value that has been read in the processing of S92 (S94).

If it is determined to execute replacement of the logical address stored in the hot detection information 63 (S94; yes), the determination unit 62 replaces the logical address that has been read in the processing of S92 with the command address, sets the probability count value to “1”, and writes back to the hot detection information 63 (S95).

If no address conflict has occurred (S93; No), the determination unit 62 stochastically determines whether or not to count up the probability count value based on the magnitude of the probability count value (S96).

If it is determined that the probability count value is to be counted up (S96; yes), the determination unit 62 counts up the probability count value that has been read in the processing of S92 and writes it back to the hot detection information 63 (S97).

If it is determined that the replacement of the logical address stored in the hot detection information 63 is not executed (S94; no), after the processing of S95, or after the processing of S97, the determination unit 62 registers the logical address that has been read in the processing of S92 in the hot list 64 corresponding to the probability count value (S98). For example, in a case where the probability count value is counted up in the processing of S97, the registration to the hot list 64 corresponding to the probability count value that has been counted up and the deletion from the hot list 64 corresponding to the probability count value before counting up.

After the processing of S98, the hot list update process ends (end).

According to the third modification, a hot address detection unit 42 can manage the hot list 64 for each probability count value. As a result, the logical address can be managed not only for the logical address having a high access frequency from a host 2 but also for each of various access frequencies. Therefore, by transmitting the hot list 64 for each probability count value as telemetry to the host 2, more detailed information regarding the access frequency can be provided to the host 2.

3.4 Fourth Modification

In the first embodiment described above, the case where the number of accesses corresponding to the logical address registered in the hot list 64 is not updated in the histogram update process has been described, but the present invention is not limited thereto. For example, in a case where the access frequency is low, the number of accesses corresponding to the logical address registered in the hot list 64 may be updated in the histogram update process.

FIG. 20 is a flowchart illustrating an example of a histogram update process in the memory system according to a fourth modification. FIG. 20 corresponds to FIG. 12 in the first embodiment.

As illustrated in FIG. 20, upon reception of the command address (start), a filter unit 71 refers to the hot list 64 and determines whether or not the command address is hit (S101).

If the command address is hit (that is, the command address exists in the hot list 64) (S101; yes), an update unit 72 determines whether or not the access frequency from the host 2 to a non-volatile memory 7 is less than a threshold value (S102). In determining the access frequency, the update unit 72 specifies in advance the number of times of receiving a command including a command address from a host 2 per unit time as the access frequency to the non-volatile memory 7.

If the command address is not hit (that is, there is no command address in the hot list 64) (S101; no), or if the access frequency is less than the threshold value (S102; yes), the update unit 72 reads the number of accesses from a histogram 34 based on the command address (S103).

The update unit 72 counts up the number of accesses read in the processing of S103 (S104).

The update unit 72 writes back the number of accesses that has been counted up in the processing of S104 to the histogram 34 (S105).

If the access frequency is equal to or greater than the threshold value (S102; no), or after the processing of S105, the histogram update process ends (end).

According to the fourth modification, in a case where the access frequency from the host 2 to the non-volatile memory 7 is less than the threshold value, a memory controller 5 executes the histogram update process regardless of whether or not the command address is registered in the hot list 64. As a result, it is possible to generate the histogram 34 more accurately reflecting the number of accesses for the logical address having a high access frequency. Therefore, more detailed telemetry can be provided to the host 2 within a range in which the load on the band of a volatile memory 6 does not increase.

3.5 Fifth Modification

In the first embodiment described above, in the histogram update process, the hot list 64 is updated based on the probability count value stored in the hot detection information 63, but the present invention is not limited thereto. For example, the hot list 64 may be updated further based on the number of accesses stored in a histogram 34.

Figure 21:
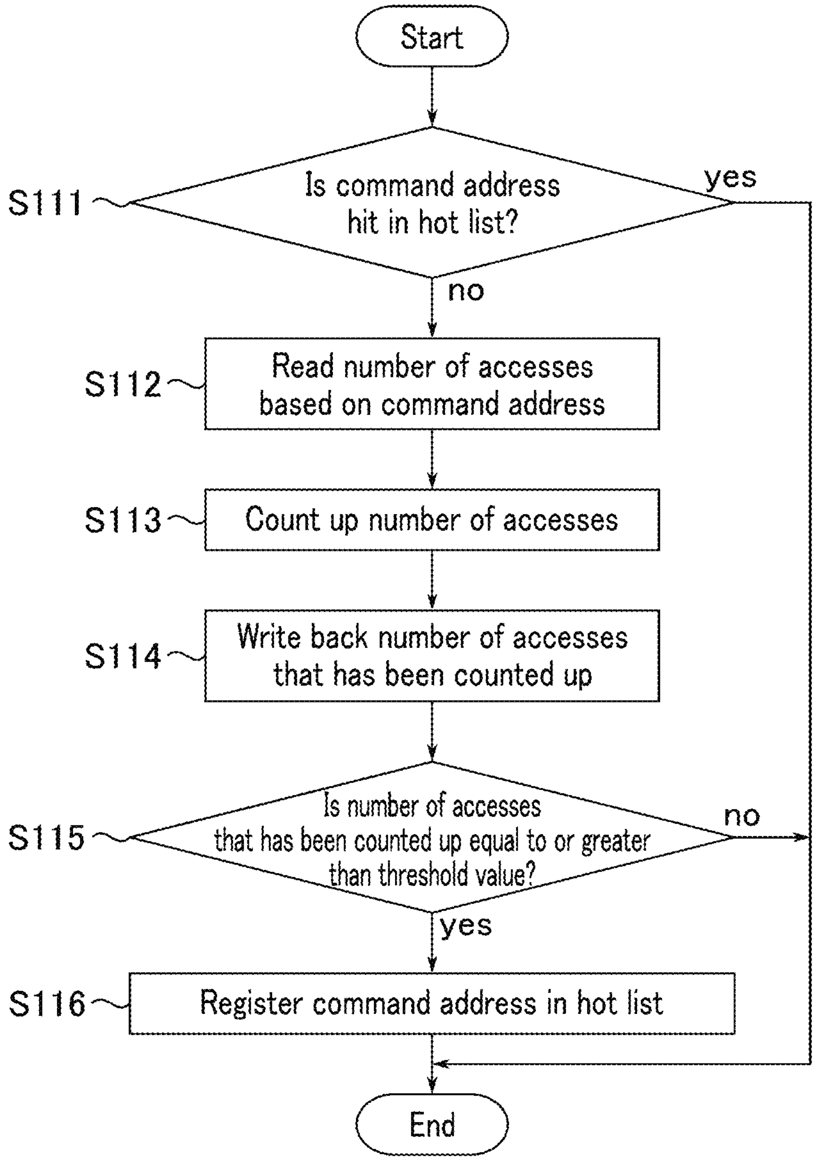
FIG. 21 is a flowchart illustrating an example of a histogram update process in a memory system according to a fifth modification.

FIG. 21 is a flowchart illustrating an example of a histogram update process in the memory system according to a fifth modification. FIG. 21 corresponds to FIG. 12 in the first embodiment.

As illustrated in FIG. 21, upon reception of the command address (start), a filter unit 71 refers to the hot list 64 and determines whether or not the command address is hit (S111).

If the command address is not hit (that is, there is no command address in the hot list 64) (S111; no), an update unit 72 reads the number of accesses from the histogram 34 based on the command address (S112).

The update unit 72 counts up the number of accesses that has been read in the processing of S112 (S113).

The update unit 72 writes back the number of accesses that has been counted up in the processing of S113 to the histogram 34 (S114).

After the processing of S114, the update unit 72 determines whether or not the number of accesses that has been counted up in the processing of S113 is equal to or larger than a threshold value (S115).

If the number of accesses that has been counted up is equal to or larger than the threshold value (S115; yes), the update unit 72 registers the command address in the hot list 64 (S116).

If the command address is hit (that is, the command address exists in the hot list 64) (S111; yes), or after the processing of S116, the histogram update process ends (end).

According to the fifth modification, the update unit 72 registers, in the hot list 64, a logical address whose number of accesses to the histogram 34 is equal to or larger than a threshold value. As a result, logical addresses that are not registered in the hot list 64 due to an influence of the stochastic determination process but have a relatively high access frequency can be efficiently registered in the hot list 64. Therefore, the load on the band of the volatile memory 6 can be further suppressed.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made 10 without departing from the spirit of the inventions. The accompanying claims and their equivalents are intended to cover such forms or modifications as would fall within the scope and spirit of the inventions.

What is claimed is:

1. A memory system configured to access a host in conformity with a CXL™ (Compute Express Link) interface protocol, the memory system comprising:
a non-volatile memory;
a volatile memory; and
a memory controller configured to manage a number of accesses to the non-volatile memory by address and store numbers of accesses in the volatile memory as a histogram, wherein
the memory controller includes an update unit configured to,
in reception of a command from the host:
in a case where a predetermined condition is satisfied, skip reading, from the volatile memory, of an number of accesses for a command address designated by the command among the numbers of accesses included in the histogram, and
in a case where the predetermined condition is not satisfied, read, from the volatile memory, the number of accesses for the command address among the numbers of accesses included in the histogram, and change the number of accesses for the command address stored in the volatile memory.

2. The memory system according to claim 1, wherein
the memory controller further includes
a first storage unit configured to store a set of an address and a count value, the set being referred to by a hash value generated by compressing the address.

3. The memory system according to claim 2, wherein
the memory controller further includes
a determination unit configured to:
specify, with reference to the set, a first address from the first storage unit based on a first hash value generated by compressing the command address, and specify a first count value corresponding to the specified first address; and
determine, based on the first count value, whether or not the command address satisfies the predetermined condition.

4. The memory system according to claim 3, wherein
the determination unit is configured to:
in a case where the first address is different from the command address, change a set of the first address and the first count value stochastically to a set of the command address and a first initial value;
in a case where the first address matches the command address, count up the first count value stochastically; and
determine whether or not the command address satisfies the predetermined condition based on the first count value after either the stochastic replacing or the stochastic counting up.

5. The memory system according to claim 4, wherein
the first initial value is 1.

6. The memory system according to claim 4, wherein
a probability of the change is lower as the first count value is larger.

7. The memory system according to claim 4, wherein
a probability of the counting up is lower as the first count value is larger.

8. The memory system according to claim 4, wherein
the determination unit is configured to determine that the command address satisfies the predetermined condition in a case where the first count value is equal to or greater than a first threshold value.

9. The memory system according to claim 4, wherein the determination unit is configured to determine stochastically whether or not the command address satisfies the predetermined condition based on the first count value, and a probability of the determination is lower as the first count value is larger.

10. The memory system according to claim 4, wherein the update unit is configured to:

in a case where the command address does not satisfy the predetermined condition, read the number of accesses corresponding to the command address from the histogram, count up the read number of accesses, and write back the number of accesses that has been counted up to the histogram; and in a case where the command address satisfies the predetermined condition, skip the reading, the counting up, and the writing back.

11. The memory system according to claim 10, wherein the update unit is configured to start the changing after a predetermined time has elapsed from the start of the determination.

12. The memory system according to claim 10, wherein the update unit is configured to:

in a case where the command address satisfies the predetermined condition and where an access frequency to the non-volatile memory is less than a second threshold value, read the number of accesses to the command address from the histogram, count up the read number of accesses, and write back the number of accesses that has been counted up to the histogram; and in a case where the command address satisfies the predetermined condition and where the access frequency to the non-volatile memory is equal to or greater than the second threshold value, skip the reading, the counting up, and the writing back.

13. The memory system according to claim 12, wherein the update unit is configured to specify a number of times of receiving a command including the command address from the host per unit time as the access frequency to the non-volatile memory.

14. The memory system according to claim 10, wherein the update unit is configured to determine that the command address satisfies the predetermined condition regardless of the determination by the determination unit in a case where the number of accesses that has been counted up is equal to or greater than a third threshold value.

15. The memory system according to claim 2, wherein the first storage unit is a static random access memory (SRAM).

16. The memory system according to claim 1, wherein the memory controller further includes:

a second storage unit configured to store bit information indicating presence or absence of access to an address; and a determination unit configured to determine, based on the bit information, whether or not an address corresponding to the bit information satisfies the predetermined condition.

17. The memory system according to claim 16, wherein the determination unit is configured to:

refer to first bit information corresponding to the command address from the second storage unit, determine that the command address satisfies the predetermined condition in a case where the first bit information transitions from a first value to a second value before and after the access to the command address, and determine that the command address does not satisfy the predetermined condition in a case where the first bit information takes the second value both before and after the access to the command address.

18. The memory system according to claim 17, wherein the update unit is configured to:

in a case where the command address satisfies the predetermined condition, skip the reading and change the number of accesses to the designated command address stored in the volatile memory to a second initial value.

19. The memory system according to claim 18, wherein the second initial value is 1.

20. The memory system according to claim 16, wherein the second storage unit is a static random access memory (SRAM).

21. The memory system according to claim 1, wherein the volatile memory is a dynamic random access memory (DRAM).

* * * * *